(12) United States Patent
Tsai et al.

(10) Patent No.: US 11,975,797 B2
(45) Date of Patent: May 7, 2024

(54) BICYCLE CALIPER, BICYCLE CALIPER CONTROL METHOD, AND BICYCLE CALIPER CONTROL SYSTEM

(71) Applicant: TEKTRO TECHNOLOGY CORPORATION, Changhua County (TW)

(72) Inventors: Szu-Fang Tsai, Changhua County (TW); Bo-Yi Liao, Changhua County (TW); Hsun-Yu Chuang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 790 days.

(21) Appl. No.: 16/913,451

(22) Filed: Jun. 26, 2020

(65) Prior Publication Data
US 2021/0009231 A1    Jan. 14, 2021

(30) Foreign Application Priority Data
Jul. 10, 2019   (TW) .................................. 108124289

(51) Int. Cl.
*B62L 3/08*     (2006.01)
*B62L 1/00*     (2006.01)
*B62L 3/02*     (2006.01)

(52) U.S. Cl.
CPC ..................... *B62L 3/02* (2013.01); *B62L 1/00* (2013.01); *B62L 3/023* (2013.01); *B62L 3/08* (2013.01)

(58) Field of Classification Search
CPC ........ B60T 8/1706; B60T 8/261; B62L 3/023; B62L 3/08; B62L 1/00; B62L 3/02
See application file for complete search history.

(56) References Cited

U.S. PATENT DOCUMENTS

| | | | | |
|---|---|---|---|---|
| 4,174,867 A | * | 11/1979 | Oberthur | B60T 11/34 303/9.74 |
| 5,219,211 A | * | 6/1993 | Tsuchida | B60T 8/54 303/6.01 |
| 5,620,237 A | * | 4/1997 | Iwashita | B60T 8/261 188/106 P |
| 5,971,499 A | * | 10/1999 | Pape | B60T 11/10 188/345 |
| 6,070,949 A | * | 6/2000 | Hariu | B62L 3/00 188/344 |
| 6,206,151 B1 | * | 3/2001 | Nakamura | B62L 3/023 188/73.1 |
| 6,273,523 B1 | * | 8/2001 | Wakabayashi | B62L 3/08 303/9.64 |

(Continued)

FOREIGN PATENT DOCUMENTS

CN          202358270 U  *  8/2012  ............... B62L 3/00

*Primary Examiner* — Bradley T King
(74) *Attorney, Agent, or Firm* — Locke Lord LLP; Tim Tingkang Xia, Esq.

(57) ABSTRACT

The disclosure provides a bicycle caliper control method. The bicycle caliper control method is configured to control a rear caliper and a front caliper of a bicycle. The bicycle caliper control method includes: when a first brake lever of the bicycle is squeezed, the first brake lever activates the rear caliper and the front caliper; and when a second brake lever of the bicycle is squeezed, the second brake lever activates the rear caliper.

5 Claims, 17 Drawing Sheets

(56) References Cited

U.S. PATENT DOCUMENTS

| | | | | |
|---|---|---|---|---|
| 6,309,029 | B1* | 10/2001 | Wakabayashi | B62L 1/00 188/106 P |
| 6,338,533 | B1* | 1/2002 | Wakabayashi | B62L 1/00 188/344 |
| 6,409,285 | B1* | 6/2002 | Wakabayashi | B62L 3/08 303/9.64 |
| 6,733,089 | B1* | 5/2004 | Wakabayashi | B62L 3/08 188/344 |
| 7,695,074 | B2* | 4/2010 | Pongo | B60T 11/101 474/212 |
| 10,252,769 | B2* | 4/2019 | Shimoda | B62L 3/023 |
| 10,464,541 | B2* | 11/2019 | Arienti | B60T 8/1706 |
| 10,814,847 | B2* | 10/2020 | Zhang | B60T 8/265 |
| 11,267,528 | B2* | 3/2022 | Nago | B60T 13/745 |
| 11,390,355 | B1* | 7/2022 | Riley | B62L 1/005 |
| 2004/0251093 | A1* | 12/2004 | Simmons | F16D 55/228 188/72.4 |
| 2005/0146207 | A1* | 7/2005 | Wagner | B60T 11/101 303/9.64 |
| 2006/0220450 | A1* | 10/2006 | Koyama | B60T 8/261 303/113.4 |
| 2007/0163851 | A1* | 7/2007 | Alexander | F16D 55/22 188/264 F |
| 2009/0200128 | A1* | 8/2009 | Takizawa | B62L 3/023 141/98 |
| 2016/0061279 | A1* | 3/2016 | Kariyama | B60T 13/745 701/70 |
| 2016/0107624 | A1* | 4/2016 | Beer | B60T 7/102 303/9.64 |
| 2016/0355166 | A1* | 12/2016 | Cantoni | B60T 8/4004 |
| 2016/0362092 | A1* | 12/2016 | Cantoni | B60T 13/686 |
| 2017/0028971 | A1* | 2/2017 | Kajiyama | B60T 8/3225 |
| 2017/0028973 | A1* | 2/2017 | Arienti | B60T 11/20 |
| 2017/0182986 | A1* | 6/2017 | Dackermann | B62L 3/023 |
| 2017/0345230 | A1* | 11/2017 | Bill | H04L 9/3271 |
| 2018/0037202 | A1* | 2/2018 | Pennala | B60T 8/3255 |
| 2018/0050669 | A1* | 2/2018 | Hohenegger | B62K 19/38 |
| 2018/0201248 | A1* | 7/2018 | Kaneta | B60T 13/18 |
| 2018/0362003 | A1* | 12/2018 | Ono | B62L 3/04 |
| 2019/0009759 | A1* | 1/2019 | Zhang | B60T 11/20 |
| 2019/0359282 | A1* | 11/2019 | Nakashima | B62J 43/13 |
| 2020/0062337 | A1* | 2/2020 | Mori | B60T 11/16 |
| 2020/0283090 | A1* | 9/2020 | Dunlap, III | F16D 55/228 |
| 2021/0070264 | A1* | 3/2021 | Arienti | B60T 8/176 |
| 2022/0204124 | A1* | 6/2022 | Katsuki | B62J 45/41 |

* cited by examiner

BICYCLE CALIPER, BICYCLE CALIPER CONTROL METHOD, AND BICYCLE CALIPER CONTROL SYSTEM

CROSS-REFERENCE TO RELATED APPLICATIONS

This non-provisional application claims priority under 35 U.S.C. § 119(a) on Patent Application No(s). 108124289 filed in Taiwan, R.O.C. on Jul. 10, 2019, the entire contents of which are hereby incorporated by reference.

TECHNICAL FIELD

The disclosure relates to a bicycle caliper control method and a bicycle caliper, more particularly to a bicycle caliper control method that can drive both the front and rear calipers as one brake lever is squeezed and to a bicycle caliper adapted therefor. In addition, the disclosure also relates to a bicycle caliper control system.

BACKGROUND

In recent years, bicycling becomes one of the most popular recreational activities, as a means of racing, transportation tools and recreation. Although the bicycles in the current market had improved and made greater function possible, there are still some issues needed to be solved.

For example, the front and rear calipers respectively for the front and rear wheels are respectively controlled by left and right brake levers, and their operations are independent of each other so that either one of them is activated will inevitably causes a speed difference between the front and rear wheels and thus resulting in safety concerns. Therefore, it is desirable to solve this issues to reduce the safety concerns.

SUMMARY OF THE INVENTION

The disclosure provides a bicycle caliper, a bicycle caliper control system, and a bicycle caliper control method that are capable of reducing the speed difference between the front wheel and the rear wheel when a brake lever is squeezed.

One embodiment of the disclosure provides a bicycle caliper control method. The bicycle caliper control method is configured to control a rear caliper and a front caliper of a bicycle. The bicycle caliper control method includes: when a first brake lever of the bicycle is squeezed, the first brake lever activates the rear caliper and the front caliper; and when a second brake lever of the bicycle is squeezed, the second brake lever activates the rear caliper.

Another embodiment of the disclosure provides a bicycle caliper. The bicycle caliper is configured to clamp a brake disk. The bicycle caliper includes a casing, two first pistons, two second pistons, and two lining pads. The casing has a first oil inlet, a first accommodation space, a second accommodation space, a second oil inlet, a third accommodation space, a fourth accommodation space, and a through hole. The first oil inlet is connected to the first accommodation space and the second accommodation space. The second oil inlet is connected to the third accommodation space and the fourth accommodation space. The first oil inlet and the second oil inlet are not fluid-connected to each other. The first accommodation space and the third accommodation space are located at one side of the through hole, and the second accommodation space and the fourth accommodation space are located at another side of the through hole. The first pistons are respectively and movably located in the first accommodation space and the second accommodation space. The second pistons are respectively and movably located in the third accommodation space and the fourth accommodation space. The lining pads are located at through hole, located between the two first pistons and between the two second pistons. The two lining pads are configured to be pushed by the two first pistons and the two second pistons so as to clamp the brake disk.

Still another embodiment of the disclosure provides a bicycle caliper control system. The bicycle caliper control system is configured to control a first caliper and a second caliper of a bicycle. The bicycle caliper control system includes a first brake lever, a hydraulic assembly, an electronic driving assembly, and an electronic activation assembly. The hydraulic assembly is configured to be connected to the first brake lever and the first caliper. The electronic driving assembly is configured to be connected to the first caliper or the second caliper. The electronic activation assembly is electrically connected to the electronic driving assembly. The electronic activation assembly is configured to activate the electronic driving assembly to drive the first caliper or the second caliper.

According to the bicycle caliper, the bicycle caliper control system, and the bicycle caliper control method as discussed above, when the first brake lever is squeezed, the first brake lever can activate both the front caliper and the rear caliper to brake the front wheel and the rear wheel of the bicycle, such that the speed difference between the front wheel and the rear wheel can be reduced or substantially eliminated, thereby securing the safety during cycling.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
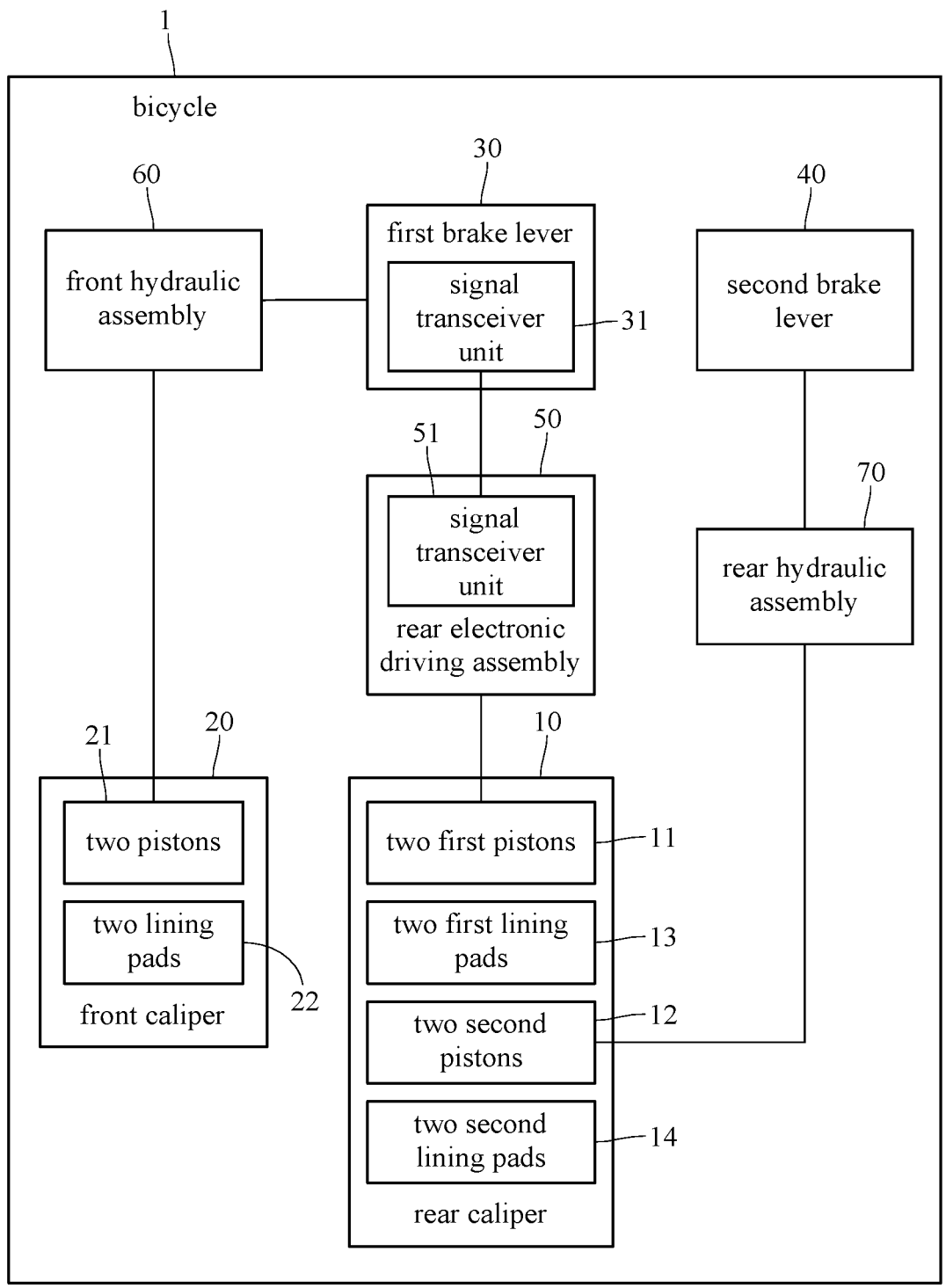
FIG. 1 is a block diagram of a bicycle adapted for a bicycle caliper control method according to a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

In the figures of the disclosure, cross-sectional surfaces of components are presented as inclined lines and dashes, which merely means that those are different components, but not mean that those components are different in material.

In the block diagrams of the disclosure, a line between two components represent that they are connected to each other via an electric cable, an oil tube or another component, but the present disclosure is not limited thereto. Without departing from the spirit and the scope of the present disclosure, the connection between two components can be implemented in different ways according actual requirements.

Referring to FIG. 1, there is shown a block diagram of a bicycle 1 adapted for a bicycle caliper control method according to a first embodiment of the disclosure.

In this embodiment, the bicycle caliper control method is configured to control a rear caliper 10 and a front caliper 20 of the bicycle 1.

The rear caliper 10 is, for example, an oil hydraulic caliper. The rear caliper 10 has two first pistons 11, two second pistons 12, two first lining pads 13, and two second lining pads 14. The first pistons 11 are configured to, for example, push the first lining pads 13 of the caliper 10. The second pistons 12 are configured, for example, to push the second lining pads 14 of the rear caliper 10. Thus, the first lining pads 13 and the second lining pads 14 of the rear caliper 10 are able to clamp a rear brake disk of the bicycle 1 to brake a rear wheel of the bicycle 1.

The front caliper 20 is, for example, an oil hydraulic caliper. The front caliper 20 has two pistons 21 and two lining pads 22. The pistons 21 are configured to, for example, push the lining pads 22 of the front caliper 20 to clamp a front brake disk of the bicycle 1 so as to brake a front wheel of the bicycle 1.

The rear caliper 10 and the front caliper 20 are configured to be driven by a first brake lever 30 and a second brake lever 40 of the bicycle 1. The first brake lever 30 is, for example, a left brake lever of the bicycle 1, and the second brake lever 40 is, for example, a right brake lever of the bicycle 1. The first brake lever 30 and the second brake lever 40 are, for example, oil hydraulic brake levers.

The bicycle caliper control method includes: when the first brake lever 30 of the bicycle 1 is squeezed, the first brake lever 30 pushes the first pistons 11 of the rear caliper 10 via a rear electronic driving assembly 50 so as to activate the rear caliper 10.

Specifically, in one embodiment, the first brake lever 30 has a signal transceiver unit 31, and the rear electronic driving assembly 50 has a signal transceiver unit 51 electrically connected to the signal transceiver unit 31 of the first brake lever 30. Note that the electrical connection between the signal transceiver units 31 and 51 may be implemented by a wireless manner or an electric cable. In addition, the rear electronic driving assembly 50 further has, for example, a motor, a link, and a piston connected to one another, and the rear electronic driving assembly 50 is connected to the rear caliper 10 via, for example, an oil tube. The motor can be used to force the link to move the piston to produce oil pressure, and the oil pressure can be transmitted to the rear caliper 10 to move the first pistons 11 via the oil tube.

When the first brake lever 30 is squeezed, the first brake lever 30 produces an activation signal, and the signal transceiver unit 31 of the first brake lever 30 transmits it to the signal transceiver unit 51 of the rear electronic driving assembly 50. When the rear electronic driving assembly 50 receives the activation signal from the signal transceiver unit 31, the rear electronic driving assembly 50 will begin to force the first pistons 11 to push the first lining pads 13 so as to make the first lining pads 13 clamp the rear brake disk to brake the rear wheel of the bicycle 1.

When the first brake lever 30 is squeezed, in addition to activate the first pistons 11, the first brake lever 30 also causes the pistons 21 of the front caliper 20 to move via a front hydraulic assembly 60 so as to activate the front caliper 20. Specifically, the front hydraulic assembly 60 includes, for example, an oil tube having two opposite ends respectively connected to the first brake lever 30 and the front caliper 20. When the first brake lever 30 is squeezed, the first brake lever 30 produces oil pressure to the front caliper 20 via the front hydraulic assembly 60 for forcing the pistons 21 of the front caliper 20 to move and push the lining pads 22 clamp the front brake disk to brake the front wheel of the bicycle 1.

In this embodiment, squeezing the first brake lever 30 can move the first pistons 11 of the rear caliper 10 and the pistons 21 of the front caliper 20 to push the first lining pads 13 and the lining pads 22 to clamp the rear and front brake disks; that is, squeezing the first brake lever 30 can brake the rear wheel and the front wheel so that the speed difference between the rear and front wheels can be reduced or substantially eliminated, thereby securing the safety during cycling.

In addition, it is possible to make modification to the electronics and mechanism of the bicycle 1 to produce a time-lag between activating the first pistons 11 of the rear caliper 10 and activating the pistons 21 of the front caliper 20 during one squeeze of the first brake lever 30, such that the first pistons 11 can be moved before the pistons 21 are moved. Therefore, the time-lag may help prevent losing control of the bicycle when sudden braking of the front caliper 20 occurs, thereby further securing the safety during cycling.

In one embodiment, the bicycle caliper control method further includes: when the second brake lever 40 is squeezed, the second brake lever 40 pushes the second pistons 12 of the rear caliper 10 via a rear hydraulic assembly 70.

Similar to the front hydraulic assembly 60, the rear hydraulic assembly 70 also includes and oil tube having two opposite ends respectively connected to the second brake lever 40 and the rear caliper 10. When the second brake lever 40 is squeezed, the second brake lever 40 produces an oil pressure to the rear caliper 10 via the rear hydraulic assembly 70 for forcing the second pistons 12 of the rear caliper 10 to move and push the second lining pads 14 to clamp the rear brake disk to brake the rear wheel of the bicycle 1.

Figure 2:
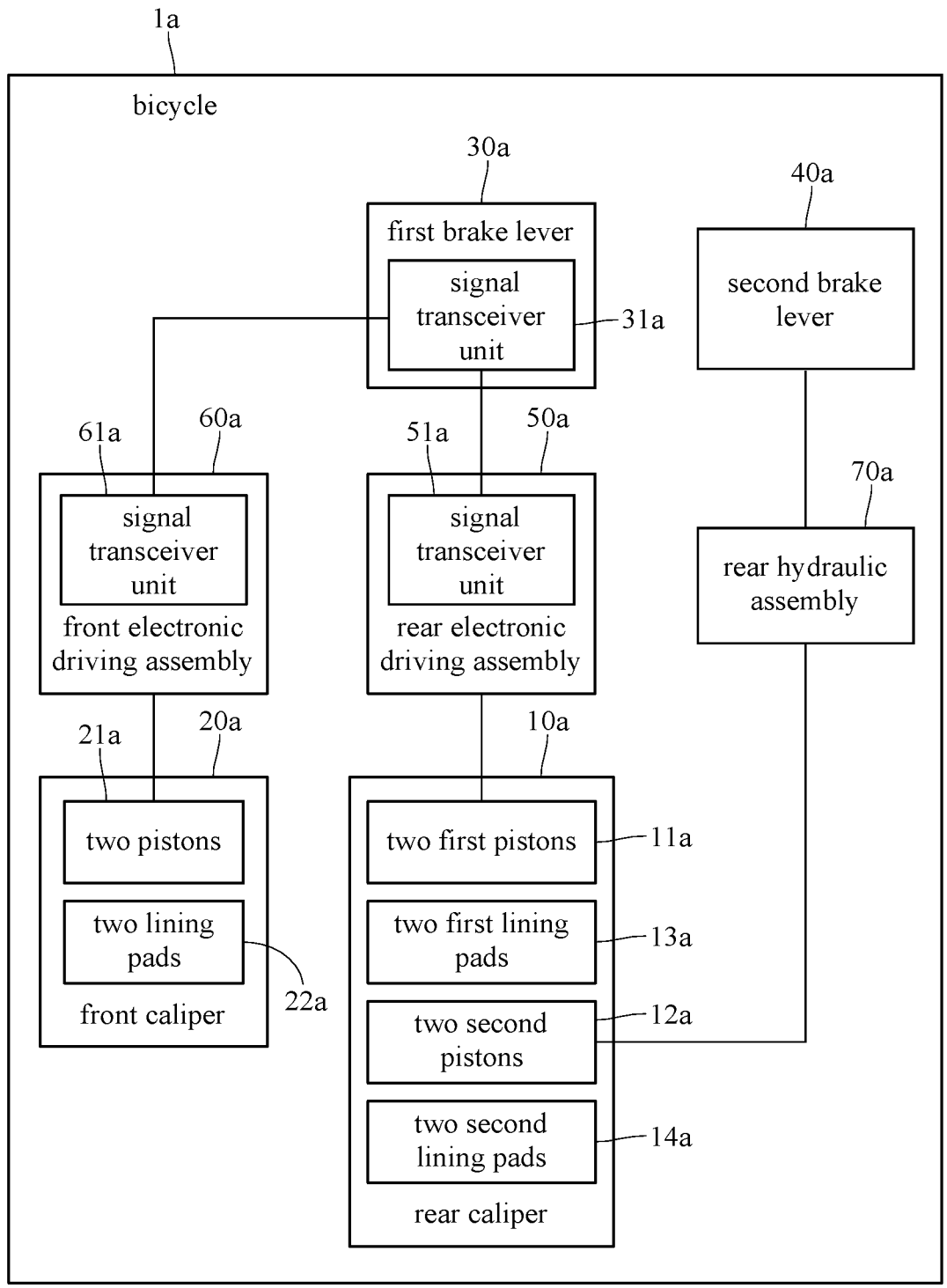
FIG. 2 is a block diagram of a bicycle adapted for a bicycle caliper control method according to a second embodiment of the disclosure.

Then. referring to FIG. 2, there is shown a block diagram of a bicycle 1*a* adapted for a bicycle caliper control method according to a second embodiment of the disclosure.

In this embodiment, the bicycle caliper control method is configured to control a rear caliper 10*a* and a front caliper 20*a* of the bicycle 1*a*. The rear caliper 10*a* and the front caliper 20*a* are respectively similar to the rear caliper 10 and the front caliper 20, and thus the same or similar parts between them will not repeated in the following descriptions.

The rear caliper 10*a* and the front caliper 20*a* are configured to be driven by a first brake lever 30*a* and a second brake lever 40*a* of the bicycle 1*a*. The first brake lever 30*a* and the second brake lever 40*a* are respectively, for example, a left brake lever and a right brake lever of the bicycle 1*a*, and both are, for example, oil hydraulic brake levers.

The bicycle caliper control method includes: when the first brake lever 30*a* is squeezed, the first brake lever 30*a* pushes two first pistons 11*a* of the rear caliper 10*a* via a rear electronic driving assembly 50*a* so as to activate the rear caliper 10*a*, and pushes the pistons 21*a* of the front caliper 20*a* via a front electronic driving assembly 60*a* so as to activate the front caliper 20*a*.

For example, the first brake lever 30*a* has a signal transceiver unit 31*a*, the rear electronic driving assembly 50*a* also has signal transceiver unit 51*a*, and the front electronic driving assembly 60*a* also has a signal transceiver unit 61*a*. The signal transceiver unit 31*a* of the first brake lever 30*a* is electrically connected to the signal transceiver unit 51*a* of the rear electronic driving assembly 50*a* and the signal transceiver unit 61*a* of the front electronic driving assembly 60*a*. Note that the electrical connections between the signal transceiver units 31*a* and 51*a* and between the signal transceiver units 31*a* and 61*a* may be implemented by a wireless manner or electric cables. In addition, the rear electronic driving assembly 50*a* further has a motor, a link, and a piston connected to one another, and the rear electronic driving assembly 50*a* is connected to the rear caliper 10*a* via, for example, an oil tube. The motor can be used to force link to move the piston to produce oil pressure, and the oil pressure can be transmitted to the rear caliper 10*a* to move the first pistons 11*a* via the oil tube. Similar to the rear electronic driving assembly 50*a*, the front electronic driving assembly 60*a* is connected to the front caliper 20*a* via, for example, an oil tube and is able to produce oil pressure to move the pistons 21*a* of the front caliper 20*a*.

When the first brake lever 30*a* is squeezed, the first brake lever 30*a* produces a first activation signal and a second activation signal and transmits them to the signal transceiver unit 51*a* of the rear electronic driving assembly 50*a* and the signal transceiver unit 61*a* of the front electronic driving assembly 60*a* through the signal transceiver unit 31*a* of the first brake lever 30*a*. By doing so, the rear electronic driving assembly 50*a* will move the first pistons 11*a* so as to make the first lining pads 13*a* of the rear caliper 10*a* clamp the rear brake disk, and the front electronic driving assembly 60*a* will move the pistons 21*a* so as to make the lining pads 22*a* of the front caliper 20*a* clamp the front brake disk, thereby braking a rear wheel and a front wheel of the bicycle 1*a*.

In this embodiment, it is possible to make modification to the electronics and mechanism of the bicycle 1*a* to produce a time-lag between activating the first pistons 11*a* of the rear caliper 10*a* and activating the pistons 21*a* of the front caliper during one squeeze of the first brake lever 30*a*, such that the first pistons 11*a* can be moved before the pistons 21*a* are moved.

Then, the bicycle caliper control method further includes: when the second brake lever 40*a* is squeezed, the second brake lever 40*a* pushes the second pistons 12*a* of the rear caliper 10*a* via a rear hydraulic assembly 70*a*.

Specifically, in one embodiment, the rear hydraulic assembly 70*a*, for example, includes an oil tube having two opposite ends respectively connected to the second brake lever 40*a* and the rear caliper 10*a*. When the second brake lever 40*a* is squeezed, the second brake lever 40*a* produces oil pressure to the rear caliper 10*a* via the rear hydraulic assembly 70*a* for forcing the second pistons 12*a* of the rear caliper 10*a* to move and push the second lining pads 14*a* to clamp the rear brake disk to brake the rear wheel of the bicycle.

Figure 3:
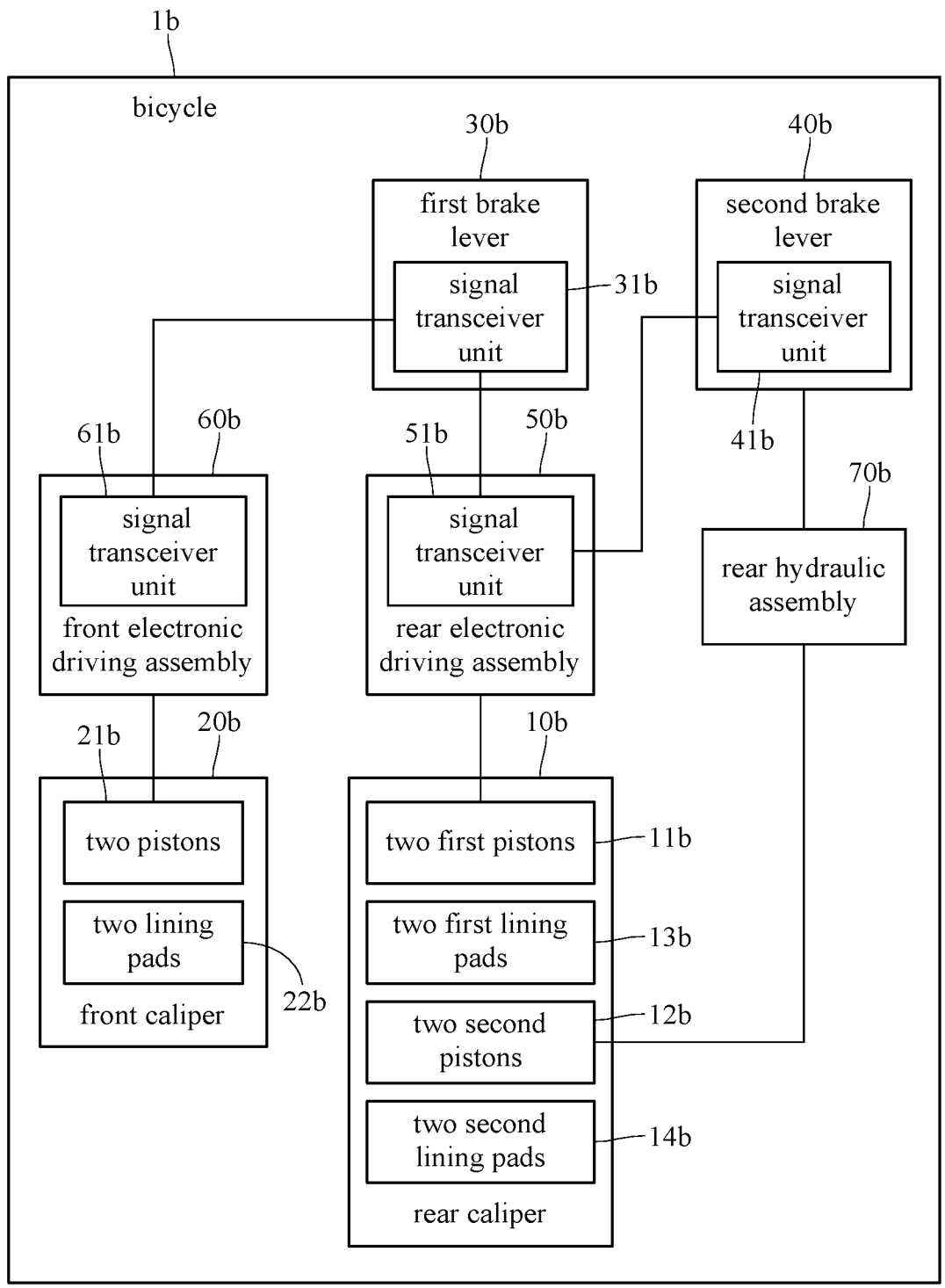
FIG. 3 is a block diagram of a bicycle adapted for a bicycle caliper control method according to a third embodiment of the disclosure.

Then, referring to FIG. 3, there is shown a block diagram of a bicycle 1*b* adapted for a bicycle caliper control method according to a third embodiment of the disclosure.

In this embodiment, the bicycle caliper control method is configured to control a rear caliper 10*b* and a front caliper 20*b* of the bicycle 1*b*.

The rear caliper 10*b* has two first pistons 11*b*, two second pistons 12*b*, two first lining pads 13*b*, and two second lining pads 14*b*. The front caliper 20*b* has two pistons 21*b* and two lining pads 22*b*. The rear caliper 10*b* and the front caliper 20*b* are respectively configured to be driven by a first brake lever 30*b* and a second brake lever 40*b* of the bicycle 1*b*.

The bicycle caliper control method includes: when the first brake lever 30*b* is squeezed, the first brake lever 30*b* pushes the first pistons 11*b* of the rear caliper 10*b* via a rear electronic driving assembly 50*b* so as to activate the rear caliper 10*b*, and pushes the pistons 21*b* of the front caliper 20*b* via a front electronic driving assembly 60*b* so as to activate the front caliper 20*b*.

For example, the first brake lever 30*b* has a signal transceiver unit 31*b*, the rear electronic driving assembly 50*b* has a signal transceiver unit 51*b*, and the front electronic driving assembly 60*b* has a signal transceiver unit 61*b*. The signal transceiver unit 31*b* of the first brake lever 30*b* is electrically connected to the signal transceiver unit 51*b* of the rear electronic driving assembly 50*b* and the signal transceiver unit 61*b* of the front electronic driving assembly 60b. Note that the electrical connections between the signal transceiver units 31b and 51b and between the signal transceiver units 31b and 61b may be implemented by a wireless manner or electrical cables. In addition, the rear electronic driving assembly 50b is connected to the rear caliper 10b via, for example, an oil tube, and the front electronic driving assembly 60b is connected to the front caliper 20b via, for example, an oil tube. The rear electronic driving assembly 50b can produce oil pressure to move the first pistons 11b of the rear caliper 10b, and the front electronic driving assembly 60b can produce oil pressure to move the pistons 21b of the front caliper 20b.

When the first brake lever 30b is squeezed, the first brake lever 30b produces a first activation signal and a second activation signal and transmits them to the signal transceiver unit 51b of the rear electronic driving assembly 50b and the signal transceiver unit 61b of the front electronic driving assembly 60b through the signal transceiver unit 31b of the first brake lever 30b. By doing so, the rear electronic driving assembly 50b will move the first pistons 11b to so as to make the first lining pads 13b clamp the rear brake disk, and the front electronic driving assembly 60b will move the pistons 21b to make the lining pads 22b clamp the front brake disk, thereby brake a rear wheel and a front wheel of the bicycle 1b.

Then, the bicycle caliper control method further includes: when the second brake lever 40b is squeezed, the second brake lever 40b pushes the second pistons 12b of the rear caliper 10b via a rear hydraulic assembly 70b and pushes the first pistons 11b of the rear caliper 10b via the rear electronic driving assembly 50b so as to activate the rear caliper 10b. In this embodiment, the second brake lever 40b is movable with a first displacement amount and a second displacement amount. Note that the first displacement amount means a pivoting angle that the second brake lever 40b is pivoted from the released position to a reference position, and the second displacement amount means a pivoting angle that the second brake lever 40b is pivoted from the released position to a position exceeding the reference position; that is, the second displacement amount is larger than the first displacement amount in pivoting angle. When the second brake lever 40b is squeezed with the first displacement amount, the second brake lever 40b pushes the first pistons 11b via the rear electronic driving assembly 50b. When the second brake lever 40b is squeezed with the second displacement amount, the second brake lever 40b pushes the first pistons 11b via the rear electronic driving assembly 50b and pushes the second pistons 12b via the rear hydraulic assembly 70b.

For example, the rear hydraulic assembly 70b includes an oil tube having two opposite ends respectively connected to the second brake lever 40b and the rear caliper 10b. The second brake lever 40b, for example, also has a signal transceiver unit 41b directly and electrically connected to the signal transceiver unit 51b of the rear electronic driving assembly 50b. The electrical connection between the signal transceiver units 41b and 51b may be implemented by a wireless manner or an electric cable.

When the second brake lever 40b is squeezed with the first displacement amount, the second brake lever 40b produce a third activation signal and transmits it to the signal transceiver unit 51b of the rear electronic driving assembly 50b through the signal transceiver unit 41b of the second brake lever 40b. By doing so, the rear electronic driving assembly 50b will move the first pistons 11b of the rear caliper 10b so as to make the first lining pads 13b clamp the rear brake disk. Then, when the second brake lever 40b is further squeezed to reach the second displacement amount, the second brake lever 40b not only makes the first lining pads 13b of the rear caliper 10b clamp the rear brake disk, but also produces oil pressure to the rear caliper 10b via the rear hydraulic assembly 70b for forcing the second pistons 12b of the rear caliper 10b to push the second lining pads 14b to clamp the rear brake disk. As a result, the first lining pads 13b and the second lining pads 14b will together clamp the rear brake disk to provide a superior braking strength of the rear caliper 10b for the rear wheel of the bicycle 1.

As discussed, in this embodiment, squeezing the second brake lever 40b with the first displacement amount will cause the first pistons 11b of the rear caliper 10b to move before the movement of the second pistons 12b, but the present disclosure is not limited thereto; in some other embodiment, squeezing the second brake lever 40b with the first displacement amount may cause the second pistons to move before the movement of the first pistons, and then the first pistons of the rear caliper will begin to move when the second brake lever is further squeezed to reach the second displacement amount.

Figure 4:
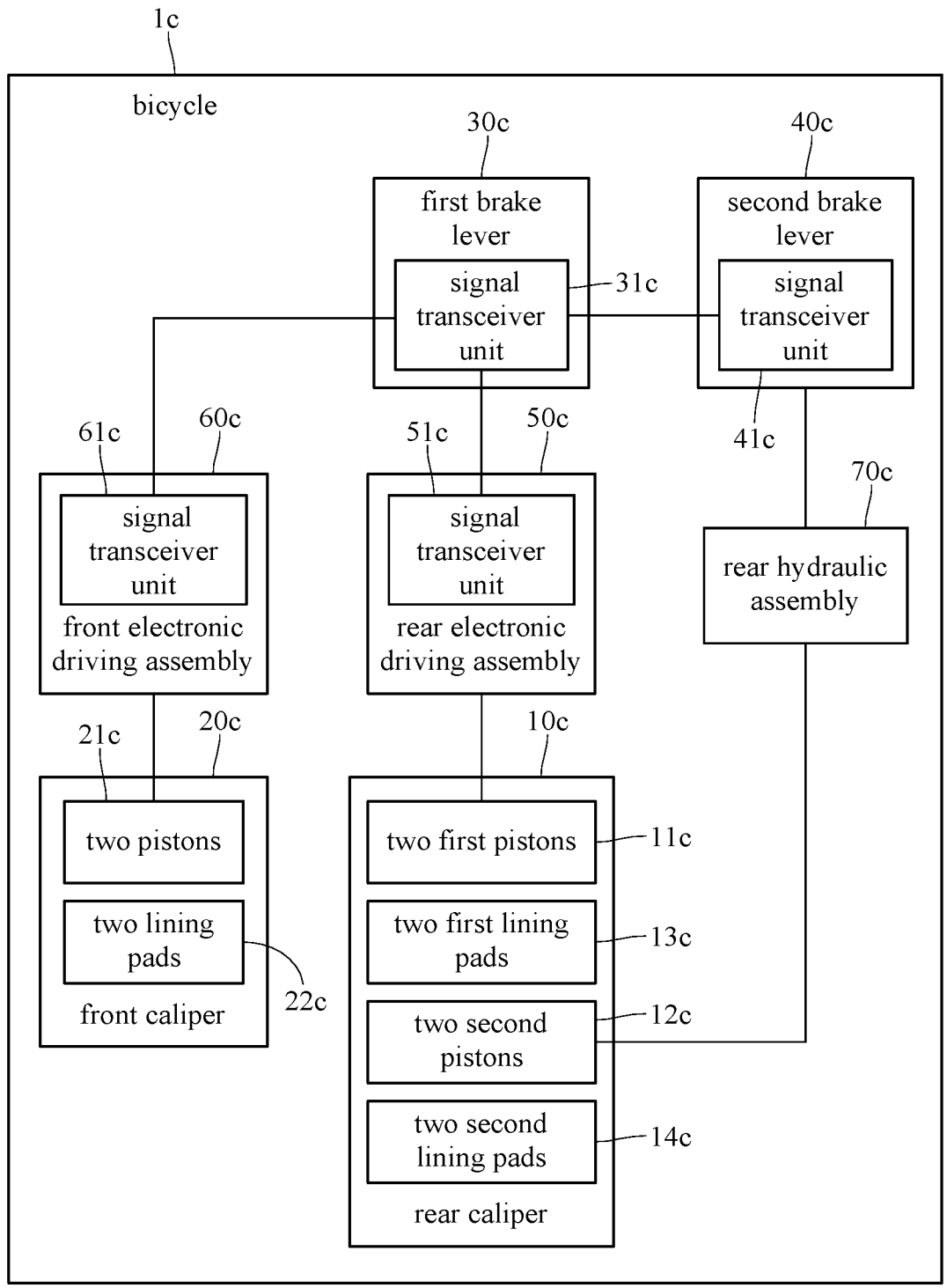
FIG. 4 is a block diagram of a bicycle adapted for a bicycle caliper control method according to a fourth embodiment of the disclosure.

Then, referring to FIG. 4, there is shown a block diagram of a bicycle 1c adapted for a bicycle caliper control method according to a fourth embodiment of the disclosure.

In this embodiment, the bicycle caliper control method is configured to control a rear caliper 10c and a front caliper 20c of the bicycle 1c.

The rear caliper 10c has two first pistons 11c, two second pistons 12c, two first lining pads 13c and two second lining pads 14c. The front caliper 20c has two pistons 21c and two lining pads 22c. The rear caliper 10c and the front caliper 20c are respectively configured to be driven by a first brake lever 30c and a second brake lever 40c of the bicycle 1c.

The bicycle caliper control method includes: when the first brake lever 30c is squeezed, the first brake lever 30c pushes the first pistons 11c of the rear caliper 10c via a rear electronic driving assembly 50c so as to activate the rear caliper 10c, and pushes the pistons 21c of the front caliper 20c via a front electronic driving assembly 60c so as to activate the front caliper 20c.

For example, the first brake lever 30c has a signal transceiver unit 31c, the rear electronic driving assembly 50c has a signal transceiver unit 51c, and the front electronic driving assembly 60c has a signal transceiver unit 61c. The signal transceiver unit 31c of the first brake lever 30c is electrically connected to the signal transceiver unit 51c of the rear electronic driving assembly 50c and the signal transceiver unit 61c of the front electronic driving assembly 60c. The electrical connections between the signal transceiver units 31c and 51c and between the signal transceiver units 31c and 61c may be implemented by a wireless manner or electric cables. In addition, the rear electronic driving assembly 50c is connected to the rear caliper 10c via, for example, an oil tube, and the front electronic driving assembly 60c is connected to the front caliper 20c via, for example, an oil tube. The rear electronic driving assembly 50c can produce oil pressure to move the first pistons 11c of the rear caliper 10c, and the front electronic driving assembly 60c can produce oil pressure to move the pistons 21c of the front caliper 20c.

When the first brake lever 30c is squeezed, the first brake lever 30c produces a first activation signal and a second activation signal and transmits them to the signal transceiver unit 51c of the rear electronic driving assembly 50c and the signal transceiver unit 61c of the front electronic driving assembly 60c through the signal transceiver unit 31c of the first brake lever 30c. By doing so, the rear electronic driving assembly 50c will move the first pistons 11c so as to make the first lining pads 13c clamp a rear brake disk, and the front electronic driving assembly 60c will move the pistons 21c to make the lining pads 22c clamp a front brake disk, thereby braking a rear wheel and a front wheel of the bicycle 1c.

Then, the bicycle caliper control method further includes: when the second brake lever 40c is squeezed, the second brake lever 40c pushes the second pistons 12c of the rear caliper 10c via a rear hydraulic assembly 70c, and pushes the first pistons of the rear caliper 10c via the rear electronic driving assembly 50c so as to activate the rear caliper 10c. In this embodiment, the second brake lever 40c is movable with a first displacement amount and a second displacement amount. Note that the first displacement amount means a pivoting angle that the second brake lever 40c is pivoted from the released position to a reference position, and the second displacement amount means a pivoting angle that the second brake lever 40c is pivoted from the released position to a position exceeding the reference position; that is, the second displacement amount is larger than the first displacement amount. When the second brake lever 40c is squeezed with the first range, the second brake lever 40c pushes the first pistons 11c via the rear electronic driving assembly 50c. When the second brake lever 40c is squeezed with the second range, the second brake lever 40c pushes the first pistons 11c via the rear electronic driving assembly 50c, and pushes the second pistons 12c via the rear hydraulic assembly 70c.

For example, the rear hydraulic assembly 70c includes an oil tube having two opposite ends respectively connected to the second brake lever 40c and the rear caliper 10c. The second brake lever 40c has, for example, a signal transceiver unit 41c indirectly and electrically connected to the signal transceiver unit 51c of the rear electronic driving assembly 50c. Specifically, the signal transceiver unit 41c of the second brake lever 40c is electrically connected to the signal transceiver unit 51c of the rear electronic driving assembly 50c via the signal transceiver unit 31c of the first brake lever 30c. The electrical connection between the signal transceiver units 31c and 41c may be implemented by a wireless manner or an electric cable.

When the second brake lever 40c is squeezed with the first displacement amount, the second brake lever 40c produces a third activation signal and transmits tit to the signal transceiver unit 51c of the rear electronic driving assembly 50c via the signal transceiver unit 41c of the second brake lever 40c and the signal transceiver unit 31c of the first brake lever 30c. By doing so, the rear electronic driving assembly 50c will move the first pistons 11c of the rear caliper 10c so as to make the first lining pads 13c clamp the rear brake disk. Then, when the second brake lever 40c is further squeezed to reach the second displacement amount, the second brake lever 40c not only makes the first lining pads 13c clamp the rear brake disk, but also produces oil pressure to the rear caliper 10c via the rear hydraulic assembly 70c for forcing the second pistons 12c to push the second lining pads 14c to clamp the rear brake disk. As a result, the first lining pads 13c and the second lining pads 14c will together clamp the rear brake disk to provide superior braking strength of the rear caliper 10c for the rear wheel of the bicycle 1c.

As discussed, in this embodiment, squeezing the second brake lever 40c with the first displacement amount will cause the first pistons 11c of the rear caliper 10c to move before the movement of the second pistons 12c, but the present disclosure is not limited thereto; in some other embodiments, squeezing the second brake lever 40c with the first displacement amount may cause the second pistons to move before the movement of the first pistons, and then the first pistons of the rear caliper will begin to move when the second brake lever is further squeezed to reach the second displacement amount.

Figure 5:
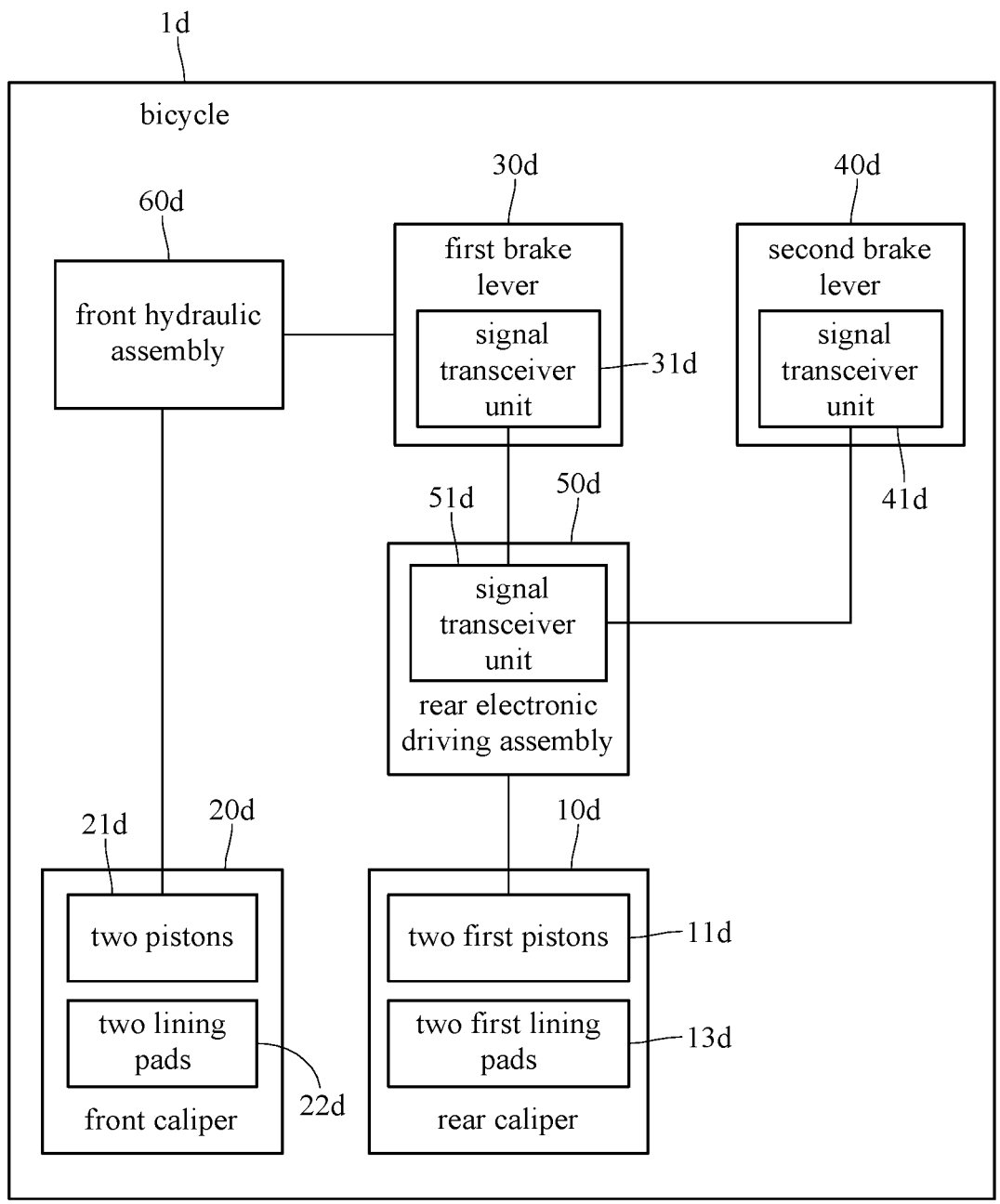
FIG. 5 is a block diagram of a bicycle adapted for a bicycle caliper control method according to a fifth embodiment of the disclosure.

Then, referring to FIG. 5, there is shown a block diagram of a bicycle 1d adapted for a bicycle caliper control method according to a fifth embodiment of the disclosure.

In this embodiment, the bicycle caliper control method is configured to control a rear caliper 10d and a front caliper 20d of the bicycle 1d.

The rear caliper 10d has two first pistons 11d and two first lining pads 13d. The front caliper 20d has two pistons 21d and two lining pads 22d. The rear caliper 10d and the front caliper 20d are configured to be driven by a first brake lever 30d and a second brake lever 40d of the bicycle 1d.

The bicycle caliper control method includes: when the first brake lever 30d of the bicycle 1d is squeezed, the first brake lever 30d pushes the first pistons 11d of the rear caliper 10d via a rear electronic driving assembly 50d so as to activate the rear caliper 10d, and pushes the pistons 21 of the front caliper 20d via a front hydraulic assembly 60d so as to activate the front caliper 20d.

For example, the first brake lever 30d has a signal transceiver unit 31d, and the rear electronic driving assembly 50d has a signal transceiver unit 51d. The signal transceiver units 31d of the first brake lever 30d is electrically connected to the signal transceiver unit 51d of the rear electronic driving assembly 50d. The electrical connection between the signal transceiver units 31d and 51d may be implemented by a wireless manner or an electric cable. In addition, the rear electronic driving assembly 50d is connected to the rear caliper 10d via an oil tube, and the rear electronic driving assembly 50d can produce oil pressure to move the first pistons 11d of the rear caliper 10d. The front hydraulic assembly 60d includes an oil tube having two opposite ends respectively connected to the first brake lever 30d and the front caliper 20d.

When the first brake lever 30d is squeezed, the first brake lever 30d produces a first activation signal and transmits it to the signal transceiver unit 51d of the rear electronic driving assembly 50d through the signal transceiver unit 31d of the first brake lever 30d. By doing so, the rear electronic driving assembly 50d will move the first pistons 11d so as to make the first lining pads 13d clamp the rear brake disk, thereby braking a rear wheel of the bicycle 1d. In addition, when the first brake lever 30d is squeezed, the first brake lever 30d also produce an oil pressure to the front caliper 20d via the front hydraulic assembly 60d for forcing the pistons 21d of the front caliper 20d to push the lining pads 22d to clamp the front brake disk, thereby braking a front wheel of the bicycle 1d. As such, the rear wheel and the front wheel of the bicycle 1d both can be braked by one squeeze of the first brake lever 30d.

Then, the bicycle caliper control method further includes: when the second brake lever 40d of the bicycle 1d is squeezed, the second brake lever 40d pushes the first pistons 11d of the rear caliper 10d via the rear electronic driving assembly 50d so as to activate the rear caliper 10d.

For example, the second brake lever 40d also has a signal transceiver unit 41d directly and electrically connected to the signal transceiver unit 51d of the rear electronic driving assembly 50d. The electrical connection between the signal transceiver units 41d and 51d may be implemented by a wireless manner or an electric cable.

When the second brake lever 40d is squeezed, the second brake lever 40d produces a second activation signal and transmits it to the signal transceiver units 51d of the rear electronic driving assembly 50d through the signal transceiver unit 41d. By doing so, the rear electronic driving assembly 50d will move the first pistons 11d of the rear caliper 10d so as to make the first lining pads 13d clamp the rear brake disk. Therefore, it is understood that the first pistons 11d of the rear caliper 10d can be moved by the same rear electronic driving assembly 50d when the first brake lever 30d or the second brake lever 40d is squeezed.

Figure 6:
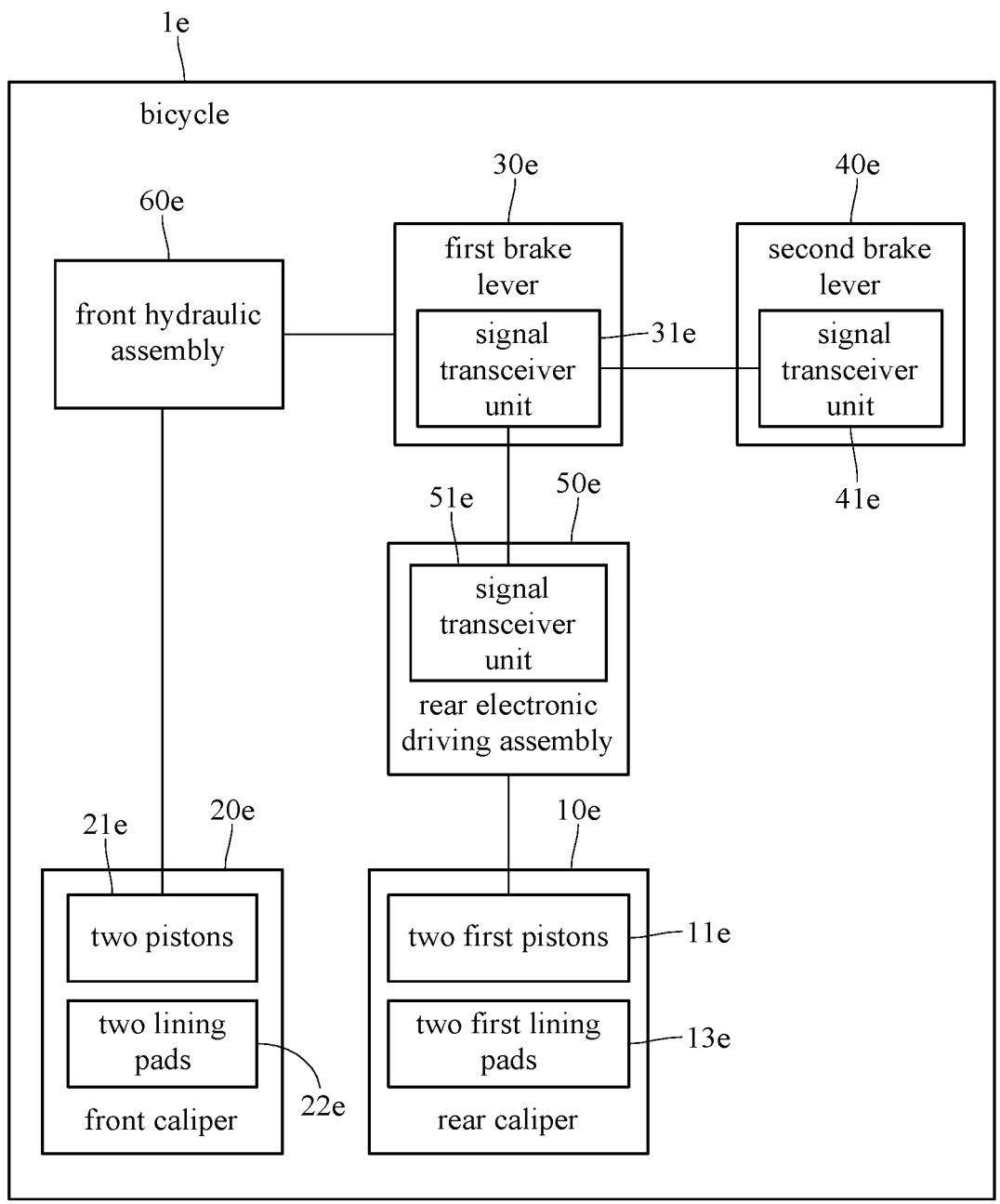
FIG. 6 is a block diagram of a bicycle adapted for a bicycle caliper control method according to a sixth embodiment of the disclosure.

Then, referring to FIG. 6, there is shown a block diagram of a bicycle 1e adapted for a bicycle caliper control method according to a sixth embodiment of the disclosure.

In this embodiment, the bicycle caliper control method is configured to control a rear caliper 10e and a front caliper 20e of the bicycle 1e.

The rear caliper 10e has two first pistons 11e and two first lining pads 13e. The front caliper 20e has two pistons 21e and two lining pads 22e. The rear caliper 10e and the front caliper 20e are configured to be driven by a first brake lever 30e and a second brake lever 40e of the bicycle 1e.

The bicycle caliper control method includes: when the first brake lever 30e of the bicycle 1e is squeezed, the first brake lever 30e pushes the first pistons 11e of the rear caliper 10e via a rear electronic driving assembly 50e so as to activate the rear caliper 10e, and pushes the pistons 21e of the front caliper 20e via a front hydraulic assembly 60e so as to activate the front caliper 20e.

For example, the first brake lever 30e has a signal transceiver unit 31e, and the rear electronic driving assembly 50e has a signal transceiver unit 51e. The signal transceiver unit 31e of the first brake lever 30e is electrically connected to the signal transceiver unit 51e of the rear electronic driving assembly 50e. The electrical connection between the signal transceiver units 31e and 51e may be implemented by a wireless manner or an electric cable. In addition, the rear electronic driving assembly 50e is connected to the rear caliper 10e via an oil tube, and the rear electronic driving assembly 50e can produce oil pressure to move the first pistons 11e of the rear caliper 10e. The front hydraulic assembly 60e includes an oil tube having two opposite ends respectively connected to the first brake lever 30e and the front caliper 20e.

When the first brake lever 30e is squeezed, the first brake lever 30e produces a first activation signal and transmits it to the signal transceiver unit 51e of the rear electronic driving assembly 50e through the signal transceiver unit 31e of the first brake lever 30d. By doing so, the rear electronic driving assembly 50e will move the first pistons 11e so as to make the first lining pads 13e clamp the rear brake disk, thereby braking a rear wheel of the bicycle 1e. In addition, when the first brake lever 30e is squeezed, the first brake lever 30e also produces an oil pressure to the front caliper 20e via the front hydraulic assembly 60e for forcing the pistons 21e of the front caliper 20e to push the lining pads 22e to clamp a front brake disk, thereby braking the front wheel of the bicycle 1e. As such, the rear wheel and the front wheel of the bicycle 1e both can be braked by one squeeze of the first brake lever 30e.

Then, the bicycle caliper control method further includes: when the second brake lever 40e of the bicycle 1e is squeezed, the second brake lever 40e pushes the first pistons 11e via the rear electronic driving assembly 50e so as to activate the rear caliper 10e.

For example, the second brake lever 40e also has a signal transceiver unit 41e, and the signal transceiver unit 41e of the second brake lever 40e is indirectly and electrically connected to the signal transceiver unit 51e of the rear electronic driving assembly 50e. Specifically, the signal transceiver unit 41e of the second brake lever 40e is electrically connected to the signal transceiver unit 51e of the rear electronic driving assembly 50e via the signal transceiver unit 31e of the first brake lever 30e. The electrical connection between the signal transceiver units 31e and 41e may be implemented by a wireless manner or an electric cable.

When the second brake lever 40e is squeezed, the second brake lever 40e produces a second activation signal and transmits it to the signal transceiver unit 51e of the rear electronic driving assembly 50e via the signal transceiver unit 41e of the second brake lever 40e and the signal transceiver unit 31e of the first brake lever 30e. By doing so, the rear electronic driving assembly 50e will move the first pistons 11e of the rear caliper 10e so as to make the first lining pads 13e clamp the rear brake disk.

Figure 7:
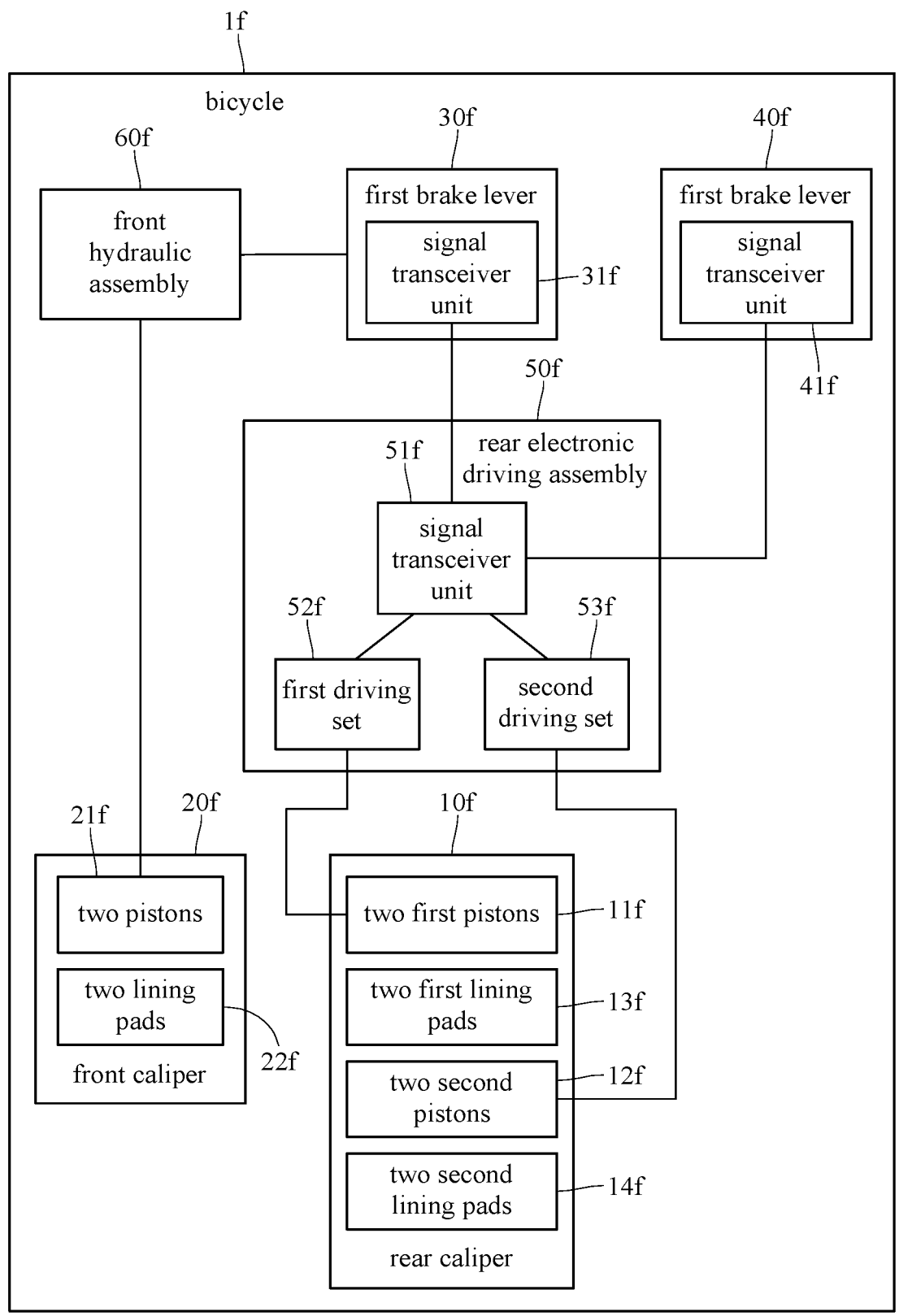
FIG. 7 is a block diagram of a bicycle adapted for a bicycle caliper control method according to a seventh embodiment of the disclosure.

Then, referring to FIG. 7, there is shown a block diagram of a bicycle 1f adapted for a bicycle caliper control method according to a seventh embodiment of the disclosure.

In this embodiment, the bicycle caliper control method is configured to control a rear caliper 10f and a front caliper 20f of the bicycle 1f.

The rear caliper 10f has two first pistons 11f, two second pistons 12f, two first lining pads 13f and two second lining pads 14f. The front caliper 20f has two pistons 21f and two lining pads 22f. The rear caliper 10f and the front caliper 20f are configured to be driven by a first brake lever 30f and a second brake lever 40f of the bicycle 1f.

The bicycle caliper control method includes: when the first brake lever 30f of the bicycle 1f is squeezed, the first brake lever 30f pushes the first pistons 11f of the rear caliper 10f via a rear electronic driving assembly 50f so as to activate the rear caliper 10f, and pushes the pistons 21f of the front caliper 20f via a front hydraulic assembly 60f so as to activate the front caliper 20f.

For example, the first brake lever 30f has a signal transceiver unit 31f, and the rear electronic driving assembly 50f has a signal transceiver unit 51. The signal transceiver unit 31e of the first brake lever 30f is electrically connected to the signal transceiver unit 51e of the rear electronic driving assembly 50f. The connection between the signal transceiver units 31e and 51e may be implemented by a wireless manner or an electric cable. In addition, the rear electronic driving assembly 50f includes a first driving set 52f, and the signal transceiver unit 51f of the rear electronic driving assembly 50f is electrically connected to the first driving set 52f. The first driving set 52f is connected to the rear caliper 10f via an oil tube, and the first driving set 52f can produce oil pressure to move the first pistons 11f of the rear caliper 10f On the other hand, the front hydraulic assembly 60f includes an oil tube having two opposite ends respectively connected to the first brake lever 30f and the front caliper 20f.

When the first brake lever 30f is squeezed, the first brake lever 30f produces a first activation signal and transmits it to the signal transceiver unit 51f of the rear electronic driving assembly 50f through the signal transceiver unit 31f of the first brake lever 30f. By doing so, the first driving set 52f of the rear electronic driving assembly 50f will move the first pistons 11f of the rear caliper 10f so as to make the first lining pads 13f clamp the rear brake disk, thereby braking a rear wheel of the bicycle 1f Also, the first brake lever 30f produces an oil pressure to the front caliper 20f via the front hydraulic assembly 60f for forcing the pistons 21f of the front caliper 20f to push the lining pads 22f to clamp the front brake disk, thereby braking a front wheel of the bicycle 1f.

Then, the bicycle caliper control method further includes: when the second brake lever 40f is squeezed, the second brake lever 40f pushes the second pistons 12f of the rear caliper 10f to move via the rear electronic driving assembly 50f so as to activate the rear caliper 10f.

For example, the rear electronic driving assembly 50f further includes a second driving set 53f, and the signal transceiver unit 51f of the rear electronic driving assembly 50f is electrically connected to the second driving set 53f. The second driving set 53f is similar to the first driving set 52f, and the second driving set 53f is also connected to the rear caliper 10f via an oil tube. The second driving set 53f can produce oil pressure for pushing the second pistons 12f of the rear caliper 10f.

When the second brake lever 40f is squeezed, the second brake lever 40f produce a second activation signal and transmits it to the signal transceiver unit 51f of the rear electronic driving assembly 50f through the signal transceiver unit 41f of the second brake lever 40f. By doing so, the second driving set 53f of the rear electronic driving assembly 50f will move the second pistons 12f of the rear caliper 10f so as to make the second lining pads 14f clamp the rear brake disk, thereby braking the rear wheel of the bicycle 1f.

In this embodiment, the rear electronic driving assembly 50f is not restricted to have only one signal transceiver unit; in some other embodiments, the rear electronic driving assembly may have two signal transceiver units. In such a configuration, the signal transceiver unit of the first brake lever and the first driving set are electrically connected to one of the signal transceiver units of the rear electronic driving assembly, and the signal transceiver unit of the second brake lever and the second driving set are electrically connected to the other.

In addition, the signal transceiver unit 41f of the second brake lever 40f is not restricted to be directly and electrically connected to the signal transceiver unit 51f of the rear electronic driving assembly 50f; in some other embodiments, the signal transceiver unit of the second brake lever may be electrically connected to the signal transceiver unit of the rear electronic driving assembly via the signal transceiver unit of the first brake lever.

Figure 8:
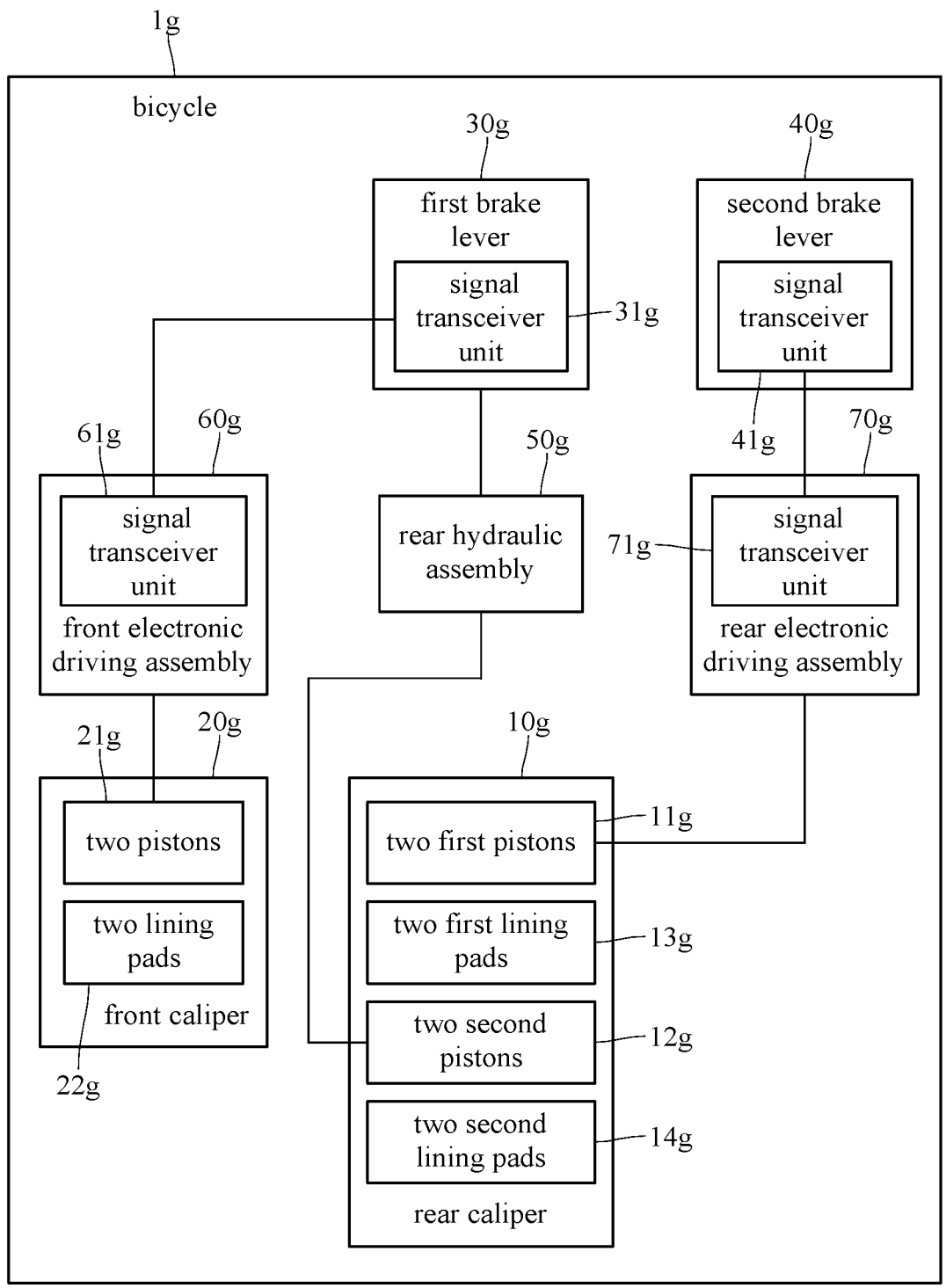
FIG. 8 is a block diagram of a bicycle adapted for a bicycle caliper control method according to an eighth embodiment of the disclosure.

Then, referring to FIG. 8, there is shown a block diagram of a bicycle 1g adapted for a bicycle caliper control method according to an eighth embodiment of the disclosure.

In this embodiment, the bicycle caliper control method is configured to control a rear caliper 10g and a front caliper 20g of the bicycle 1g.

The rear caliper 10g is, for example, an oil hydraulic caliper. The rear caliper 10g has two first pistons 11g, two second pistons 12g, two first lining pads 13g and two second lining pads 14g. The first pistons 11g are configured to push the first lining pads 13g of the rear caliper 10g, and the second pistons 12g are configured to push the second lining pads 14g of the rear caliper 10g. Thus, the first lining pads 13g and the second lining pads 14g of the rear caliper 10g can clamp a rear brake disk of the bicycle 1g to brake a rear wheel of the bicycle 1g.

The front caliper 20g is, for example, an oil hydraulic caliper. The front caliper 20g has two pistons 21g and two lining pads 22g. The pistons 21g are configured to push the lining pads 22g of the front caliper 20g to clamp a front brake disk of the bicycle 1g to brake a front wheel of the bicycle 1g.

The rear caliper 10g and the front caliper 20g are respectively configured to be driven by a first brake lever 30g and a second brake lever 40g of the bicycle 1g. The first brake lever 30g and the second brake lever 40g are respectively, for example, a left brake lever and a right brake lever, and both are oil hydraulic brake levers.

The bicycle caliper control method includes: when the first brake lever 30g is squeezed, the first brake lever 30g pushes the second pistons 12g of the rear caliper 10g via a rear hydraulic assembly 50g so as to activate the rear caliper 10g, and pushes the pistons 21g of the front caliper 20g via a front electronic driving assembly 60g so as to activate the front caliper 20g.

For example, the rear hydraulic assembly 50g includes an oil tube having two opposite ends respectively connected to the first brake lever 30g and the rear caliper 10g. The first brake lever 30g has a signal transceiver unit 31g, and the front electronic driving assembly 60g has a signal transceiver unit 61g. The signal transceiver unit 31g of the first brake lever 30g is electrically connected to the signal transceiver unit 61g of the front electronic driving assembly 60g. The electrical connection between the signal transceiver units 31g and 61g may be implemented by a wireless manner or an electric cable. In addition, the front electronic driving assembly 60g is connected to the front caliper 20g via an oil tube, and the front electronic driving assembly 60g can produce oil pressure to move the pistons 21g of the front caliper 20g.

When the first brake lever 30g is squeezed, the first brake lever 30g produces an oil pressure to the rear caliper 10g via the rear hydraulic assembly 50g for forcing the second pistons 12g of the rear caliper 10g to push the second lining pads 14g to clamp the rear brake disk, thereby braking the rear wheel of the bicycle 1g. In addition to activate the second pistons 12g, when the first brake lever 30g is squeezed, the first brake lever 30g also produces a first activation signal and transmits it to the signal transceiver unit 61g of the front electronic driving assembly 60g through the signal transceiver unit 31g of the first brake lever 30g. By doing so, the front electronic driving assembly 60g will move the pistons 21g so as to make the lining pads 22g clamp the front brake disk, thereby braking the front wheel of the bicycle 1g.

Then, the bicycle caliper control method further includes: when the second brake lever 40g is squeezed, the second brake lever 40g pushes the first pistons 11g of the rear caliper 10g via a rear electronic driving assembly 70g.

For example, the second brake lever 40g has a signal transceiver unit 41g, and the rear electronic driving assembly 70g also has a signal transceiver unit 71g. The signal transceiver unit 41g of the second brake lever 40g is directly and electrically connected to the signal transceiver unit 71g of the rear electronic driving assembly 70g. The electrical connection between the signal transceiver units 41g and 71g may be implemented by a wireless manner or an electric cable. In addition, the rear electronic driving assembly 70g is similar to the front electronic driving assembly 60g. The rear electronic driving assembly 70g is connected to the rear caliper 10g via an oil tube, and the rear electronic driving assembly 70g can produce oil pressure to move the first pistons 11g of the rear caliper 10g.

When the second brake lever 40g is squeezed, the second brake lever 40g produces a second activation signal and transmits it to the signal transceiver unit 71g of the rear electronic driving assembly 70g through the signal transceiver unit 41g of the second brake lever 40g. By doing so, the rear electronic driving assembly 70g will move the first pistons 11g of the rear caliper 10g so as to make the first lining pads 13g clamp the rear brake disk, thereby braking the rear wheel of the bicycle 1g.

Figure 9:
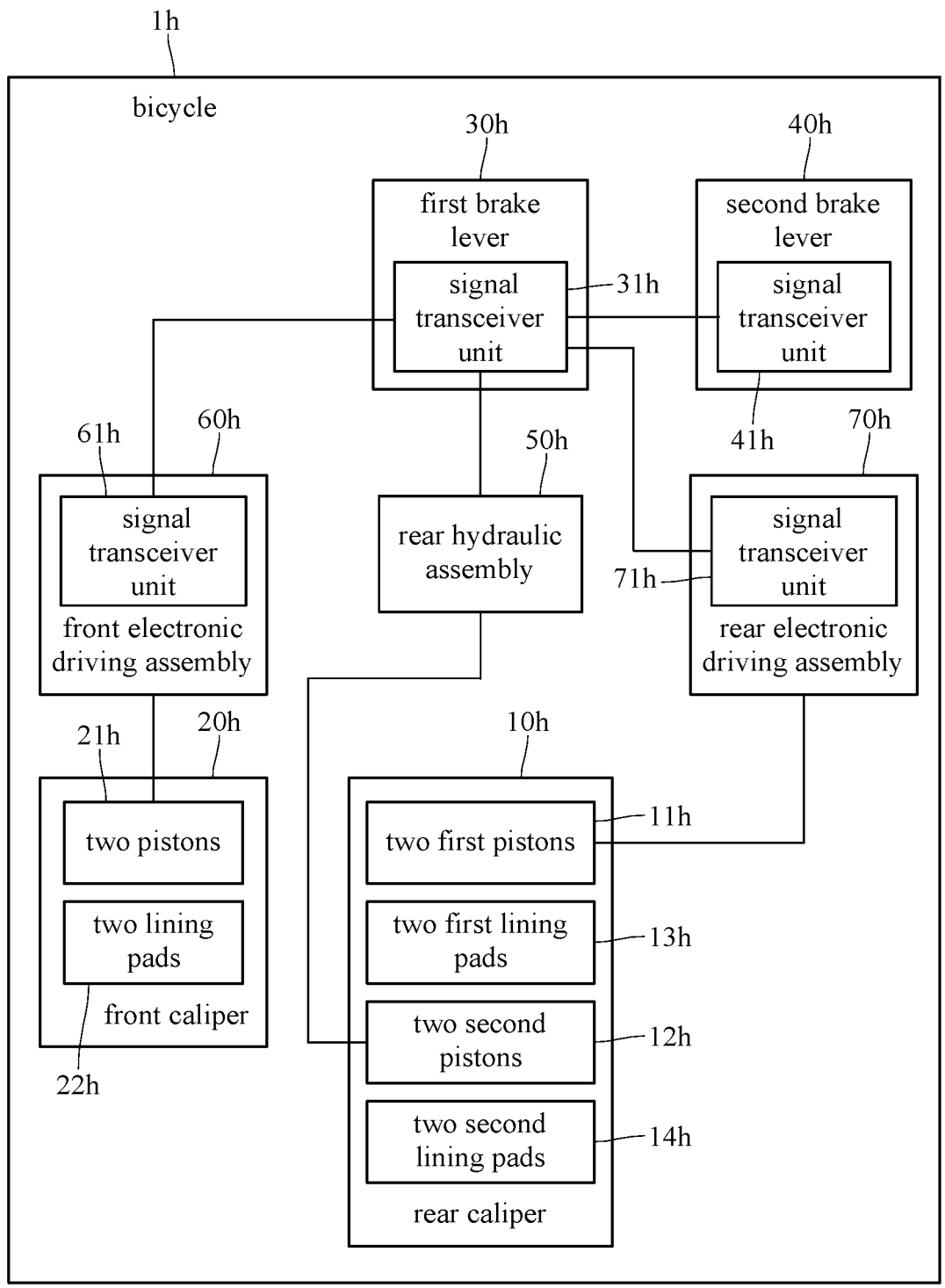
FIG. 9 is a block diagram of a bicycle adapted for a bicycle caliper control method according to a ninth embodiment of the disclosure.

Then, referring to FIG. 9, there is shown a block diagram of a bicycle 1h adapted for a bicycle caliper control method according to a ninth embodiment of the disclosure.

In this embodiment, the bicycle caliper control method is configured to control a rear caliper 10h and a front caliper 20h of the bicycle 1h.

The rear caliper 10h has two first pistons 11h, two second pistons 12h, two first lining pads 13h and two second lining pads 14h. The front caliper 20h has two pistons 21h and two lining pads 22h. The rear caliper 10h and the front caliper 20h are respectively configured to be driven by a first brake lever 30h and a second brake lever 40h of the bicycle 1h.

The bicycle caliper control method includes: when the first brake lever 30h is squeezed, the first brake lever 30h pushes the second pistons 12g of the rear caliper 10g via a rear hydraulic assembly 50h so as to activate the rear caliper 10h, and pushes the pistons 21h of the front caliper 20h via a front electronic driving assembly 60h so as to activate the front caliper 20h.

For example, the rear hydraulic assembly 50h includes an oil tube having two opposite ends respectively connected to the first brake lever 30h and the rear caliper 10h. The first brake lever 30h has a signal transceiver unit 31h, and the front electronic driving assembly 60h has a signal transceiver unit 61h. The signal transceiver unit 31h of the first brake lever 30h is electrically connected to the signal transceiver unit 61h of the front electronic driving assembly 60h. The electrical connection between the signal transceiver units 31h and 61h may be implemented by a wireless manner or an electric cable. In addition, the front electronic driving assembly 60h is connected to the front caliper 20h via an oil tube, and the front electronic driving assembly 60h can produce oil pressure to move the pistons 21h of the front caliper 20h.

When the first brake lever 30h is squeezed, the first brake lever 30h produces an oil pressure to the rear caliper 10h via the rear hydraulic assembly 50h for forcing the second pistons 12h of the rear caliper 10h to push the second lining pads 14h to clamp the rear brake disk, thereby braking a rear wheel of the bicycle 1h. In addition to activate the second pistons 12h, when the first brake lever 30h is squeezed, the first brake levers 30h also produces a first activation signal and transmits it to the signal transceiver unit 61h of the front electronic driving assembly 60h through the signal transceiver unit 31h of the first brake lever 30h. By doing so, the front electronic driving assembly 60h will move the pistons 21h so as to make the lining pads 22h clamp the front brake disk, thereby braking a front wheel of the bicycle 1h.

Then, the bicycle caliper control method further includes: when the second brake lever 40h is squeezed, the second brake lever 40h pushes the first pistons 11h of the rear caliper 10h via a rear electronic driving assembly 70h so as to activate the rear caliper 10h.

For example, the second brake lever 40h has a signal transceiver unit 41h, and the rear electronic driving assembly 70h also has a signal transceiver unit 71h. The signal transceiver unit 41h of the second brake lever 40h is indirectly and electrically connected to the signal transceiver unit 71h of the rear electronic driving assembly 70h. Specifically, the signal transceiver unit 41h of the second brake lever 40h is electrically connected to the signal transceiver unit 71h of the rear electronic driving assembly 70h via the signal transceiver unit 31h of the first brake lever 30h. The electrical connections among the signal transceiver units 31h, 41h and 71h may be implemented by a wireless manner or electric cables. In addition, the rear electronic driving assembly 70h is connected to the rear caliper 10h via an oil tube, and the rear electronic driving assembly 70h can produce oil pressure to move the first pistons 11h of the rear caliper 10h.

When the second brake lever 40h is squeezed, the second brake lever 40h produces a second activation signal and transmits it to the signal transceiver unit 71h of the rear electronic driving assembly 70h via the signal transceiver unit 41h of the second brake lever 40h and the signal transceiver unit 31h of the first brake lever 30h. By doing so, the rear electronic driving assembly 70h will move the first pistons 11h of the rear caliper 10h so as to make the first lining pads 13h clamp the rear brake disk, thereby braking the rear wheel of the bicycle 1h.

Figure 10:
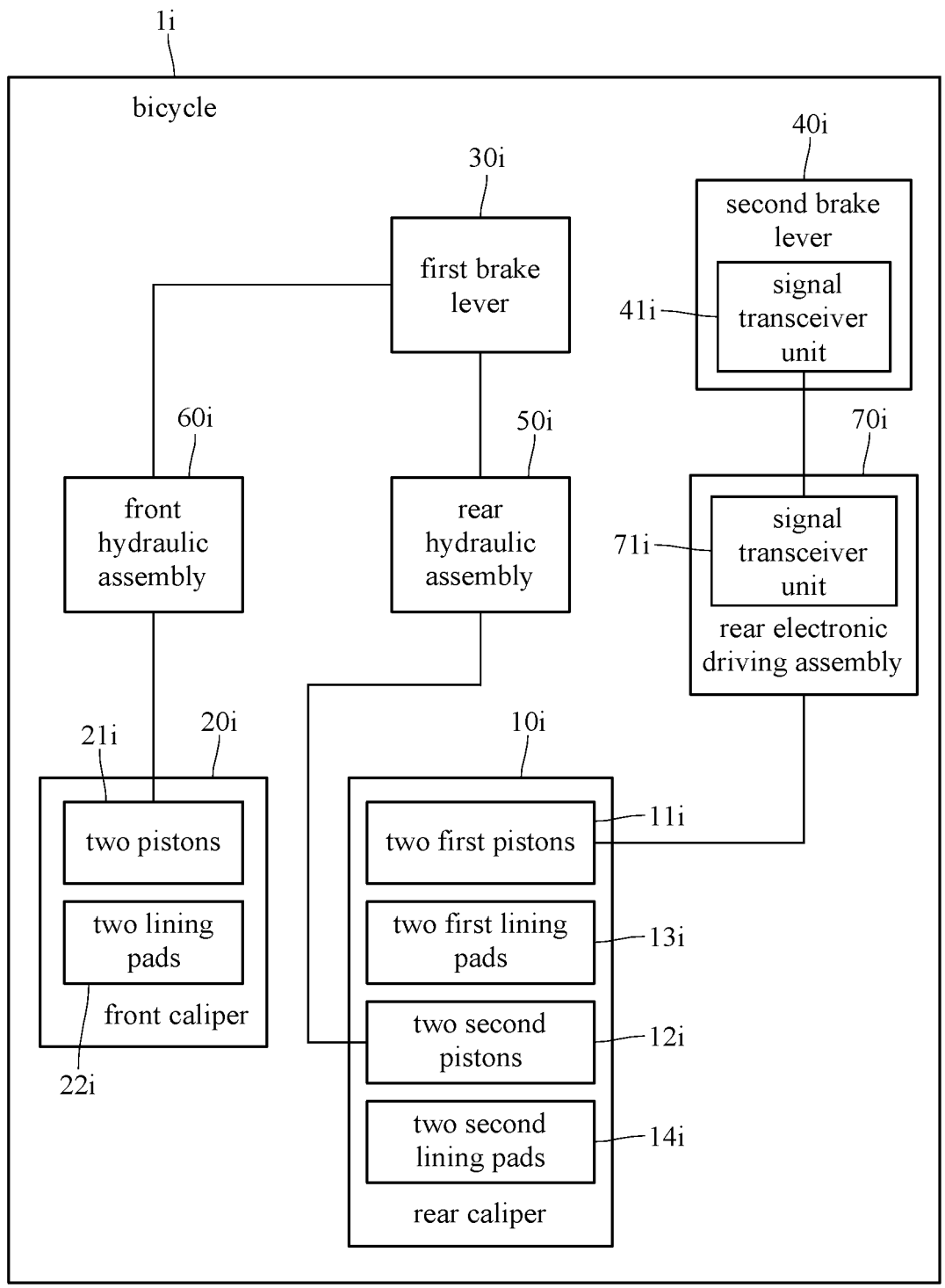
FIG. 10 is a block diagram of a bicycle adapted for a bicycle caliper control method according to a tenth embodiment of the disclosure.

Then, referring to FIG. 10, there is shown a block diagram of a bicycle 1i adapted for a bicycle caliper control method according to a tenth embodiment of the disclosure.

In this embodiment, the bicycle caliper control method is configured to control a rear caliper 10i and a front caliper 20i of the bicycle 1i.

The rear caliper 10i has two first pistons 11i, two second pistons 12i, two first lining pads 13i and two second lining pads 14i. The front caliper 20i has two pistons 21i and two lining pads 22i. The rear caliper 10i and the front caliper 20i are respectively configured to be driven by a first brake lever 30i and a second brake lever 40i of the bicycle 1i.

The bicycle caliper control method includes: when the first brake lever 30i is squeezed, the first brake lever 30i pushes the second pistons 12i of the rear caliper 10i via a rear hydraulic assembly 50i so as to activate the rear caliper 10i, and pushes the pistons 21i of the front caliper 20i via a front hydraulic assembly 60i so as to activate the front caliper 20i.

For example, the rear hydraulic assembly 50i includes an oil tube having two opposite ends respectively connected to the first brake lever 30i and the rear caliper 10i. The front hydraulic assembly 60i includes an oil tube having two opposite ends respectively connected to the first brake lever 30i and the front caliper 20i.

When the first brake lever 30i is squeezed, the first brake lever 30i produce an oil pressure to the rear caliper 10i and the front caliper 20i via the rear hydraulic assembly 50i and the front hydraulic assembly 60i for forcing the second pistons 12i of the rear caliper 10i to push the second lining pads 14i to clamp the rear brake disk and forcing the pistons 21i of the front caliper 20i to push the lining pads 22i to clamp the front brake disk, thereby braking a rear wheel and a front wheel of the bicycle 1i.

Then, the bicycle caliper control method further includes: when the second brake lever 40i is squeezed, the second brake lever 40i pushes the first pistons of the rear caliper 10i to move via a rear electronic driving assembly 70i so as to activate the rear caliper 10i.

For example, the second brake lever 40i has a signal transceiver unit 41i, and the rear electronic driving assembly 70i also has a signal transceiver unit 71i. The signal transceiver unit 41i of the second brake lever 40i is electrically connected to the signal transceiver unit 71i of the rear electronic driving assembly 70i. The electrical connection between the signal transceiver units 41i and 71i may be implemented by a wireless manner or an electric cable. In addition, the rear electronic driving assembly 70i is connected to the rear caliper 10i via an oil tube, and the rear electronic driving assembly 70i can produce oil pressure to move the first pistons 11i of the rear caliper 10i.

When the second brake lever 40i is squeezed, the second brake lever 40i produces an activation signal and transmits it to the signal transceiver unit 71i of the rear electronic driving assembly 70i through the signal transceiver unit 41i of the second brake lever 40i. By doing so, the rear electronic driving assembly 70i will move the first pistons 11i of the rear caliper 10i so as to make the first lining pads 13i clamp the rear brake disk, thereby braking the rear wheel of the bicycle 1i.

In the previous embodiments, the rear caliper is not restricted to have four lining pads; in some other embodiments, the rear caliper may only have two lining pads, and the two lining pads may be pushed by the first pistons or the second pistons of the rear caliper.

Figure 11:
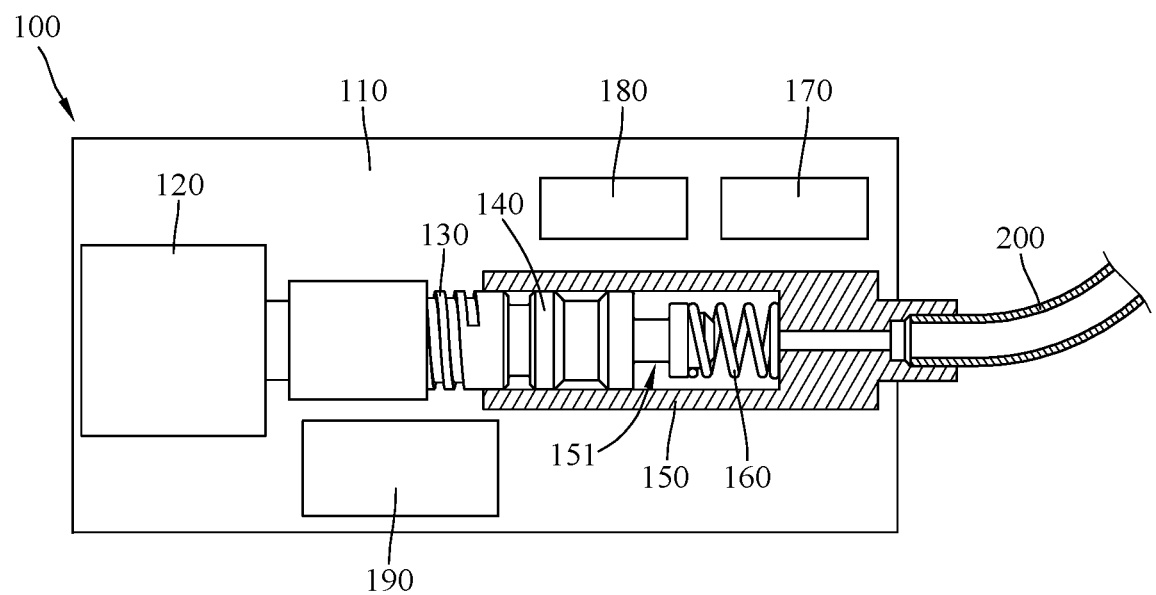
FIG. 11 is a partially cross-sectional view of an electronic driving assembly adapted for a bicycle caliper control method of the disclosure.

Then, referring to FIG. 11, there is shown a partially cross-sectional view of an electronic driving assembly 100 adapted for a bicycle caliper control method of the disclosure.

The electronic driving assembly 100 shown in FIG. 11 may be considered as the front electronic driving assembly or the rear electronic driving assembly of the previous embodiment. In this embodiment, the electronic driving assembly 100 includes a circuit board 110, a motor 120, a stud 130, a piston 140, a pressure tank 150, an elastic component 160, a signal transceiver unit 170, a control unit 180, and a battery unit 190.

The motor 120 is disposed on and electrically connected to the circuit board 110. Two opposite ends of the stud 130 are respectively connected to the motor 120 and the piston 140. The pressure tank 150 has a chamber 151. The piston 140 and the elastic component 160 are located in the chamber 151, and the elastic component 160 is configured to force the piston 140 to move toward the motor 120 so as to move the piston 140 back to its original position. One end of the chamber 151 is connected to the caliper (e.g., the rear caliper or the front caliper) via, for example, an oil tube 200.

The signal transceiver unit 170, the control unit 180, and the battery unit 190 are disposed on the circuit board 110. The signal transceiver unit 170 and the battery unit 190 are electrically connected to the control unit 180 via the circuit board 110. The control unit 180 is electrically connected to the motor 120 via the circuit board 110. When the signal transceiver unit 170 receives an activation signal, the signal transceiver unit 170 transmits the activation signal to the control unit 180 to request the control unit 180 to activate the motor 120. Then, the motor 120 will rotate the stud 130 so as to move the piston 140 and therefore produces oil pressure in the chamber 151. And the oil pressure is transmitted to the caliper via the oil tube to push the pistons of the caliper to make the lining pads clamp the brake disk.

Figure 12:
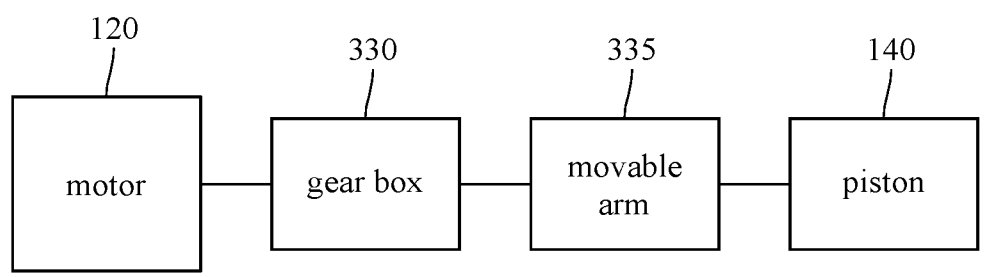
FIG. 12 is a block diagram of an electronic driving assembly adapted for a bicycle caliper control method of the disclosure.

Then, referring to FIG. 12, there are shown a block diagram of an electronic driving assembly adapted for a bicycle caliper control method of the disclosure.

In this embodiment, the electronic driving assembly shown in FIG. 12 is similar to the electronic driving assembly 100 shown in FIG. 11, one of the main differences between these two embodiments is the way that the motor drives the pistons, thus, for the purpose of simple description, the same or similar parts between them will not be repeated hereinafter. In this embodiment, the electronic driving assembly includes a gear box 330 and a movable arm 335. The motor 120 can drive the movable arm 335 via the gear box 330 to push the piston 140. This operation also can produce oil pressure in the pressure tank 150 (as shown in FIG. 12).

Figure 13:
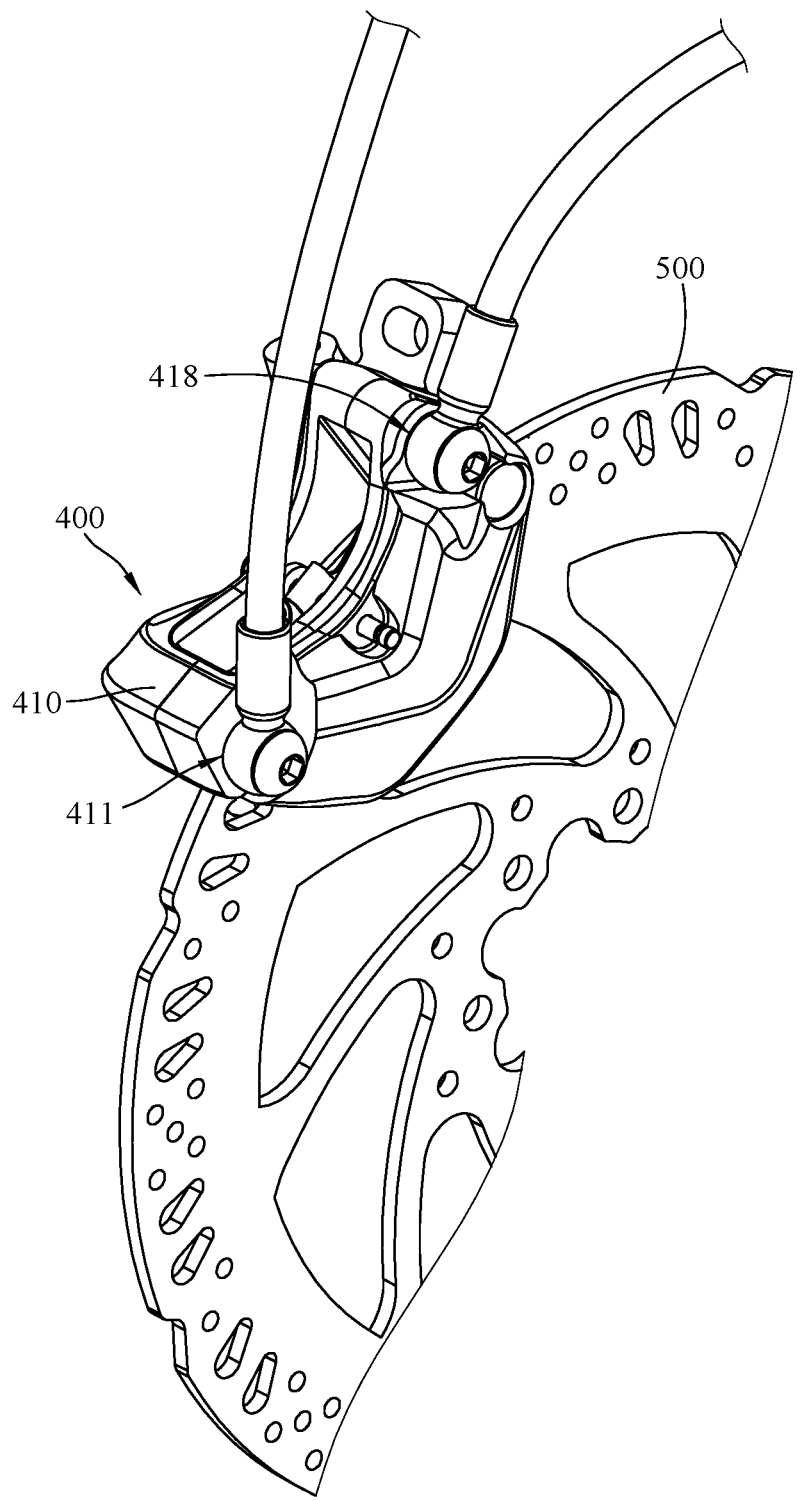
FIG. 13 is a perspective view of a bicycle caliper according to an eleventh embodiment of the disclosure.
Figure 14:
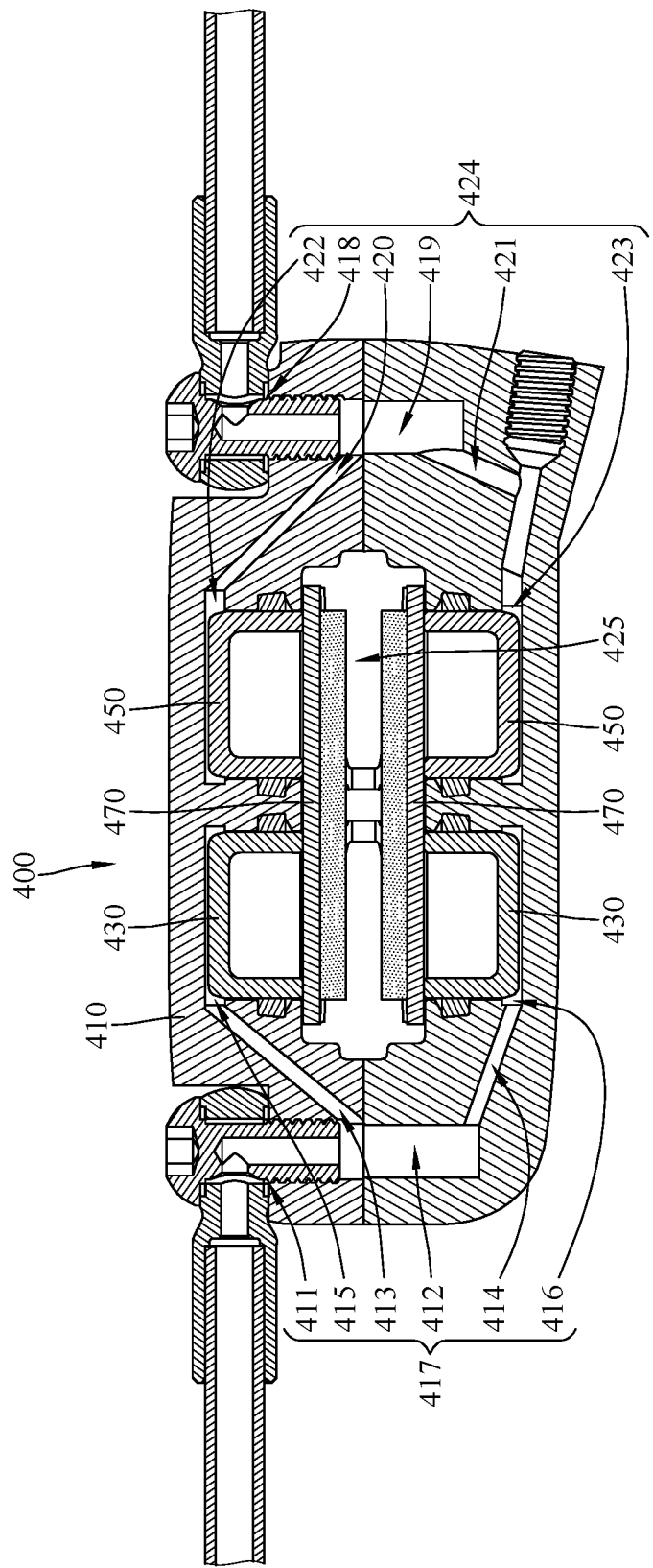
FIG. 14 is a cross-sectional view of the bicycle caliper in FIG. 13.

Then, referring to FIGS. 13 and 14, FIG. 13 is a perspective view of a bicycle caliper 400 according to an eleventh embodiment of the disclosure, and FIG. 14 is a cross-sectional view of the bicycle caliper 400 in FIG. 13.

In this embodiment, the bicycle caliper 400 is, for example, the rear caliper as discussed above. The bicycle caliper 400 is configured to clamp a brake disk 500. The bicycle caliper includes a casing 410, two first pistons 430, two second pistons 450, and two lining pads 470.

The casing 410 has a first oil inlet 411, a first connection channel 412, a first divergent channel 413, a second divergent channel 414, a first accommodation space 415, and a second accommodation space 416. The first oil inlet 411 is connected to the first connection channel 412. Two opposite ends of the first divergent channel 413 are respectively connected to the first connection channel 412 and the first accommodation space 415. Two opposite ends of the second divergent channel 414 are respectively connected to the first connection channel 412 and the second accommodation space 416. The first oil inlet 411, the first connection channel 412, the first divergent channel 413, the second divergent channel 414, the first accommodation space 415, and the second accommodation space 416 are connected to each other directly or indirectly, and thus together forming a first space 417.

In addition, the casing 410 further has a second oil inlet 418, a second connection channel 419, a third divergent channel 420, a fourth divergent channel 421, a third accommodation space 422, and a fourth accommodation space 423. The second oil inlet 418 is connected to the second connection channel 419. Two opposite ends of the third divergent channel 420 are respectively connected to the second connection channel 419 and the third accommodation space 422, and two opposite ends of the fourth divergent channel 421 are respectively connected to the second connection channel 419 and the fourth accommodation space 423. The second oil inlet 418, the second connection channel 419, the third divergent channel 420, the fourth divergent channel 421, the third accommodation space 422, and the fourth accommodation space 423 are connected to each other directly or indirectly, and thus together forming a second space 424.

The casing 410 further has a through hole 425. The first accommodation space 415 and the third accommodation space 422 are located at one side of the through hole 425, and the second accommodation space 416 and the fourth accommodation space 423 are located at another side of the through hole 425. The first pistons 430 are respectively and movably located at the first accommodation space 415 and the second accommodation space 416, and the second pistons 450 are respectively and movably located at the third accommodation space 422 and the fourth accommodation space 423. The lining pads 470 are located in the through hole 425 and located between the first pistons 430 and between the second pistons 450, such that the lining pads can be pushed by the first pistons 430 and the second pistons 450 to clamp the brake disk 500.

In the bicycle caliper 400, the first oil inlet 411, and the second oil inlet 418 are not fluid-connected to each other, in other words, the first space 417 and the second space 424 are not fluid-connected to each other.

In the bicycle caliper 400, the first pistons 430, the second pistons 450, and the lining pads 470 are, for example, the first pistons, the second pistons, and the lining pads of the previous embodiments as discussed above.

The first oil inlet 411 is configured to be connected to an electronic driving assembly, and the second oil inlet 418 is, for example. configured to be connected to a hydraulic assembly. The electronic driving assembly is, for example, the rear electronic driving assembly as discussed above and shown in FIG. 11 or 12, and the hydraulic assembly is, for example, the rear hydraulic assembly of the previous embodiments as discussed above. The oil pressure produced by the piston of the electronic driving assembly can be transmitted to the first accommodation space 415 and the second accommodation space 416 via the first oil inlet 411, such that the first piston 430 can be moved to cause the lining pads 470 to clamp the brake disk 500. The oil pressure transmitted by the rear hydraulic assembly can be transmitted to the third accommodation space 422 and the fourth accommodation space 423 via the second oil inlet 418, such that the second pistons 450 can be moved to cause the lining pads 470 to clamp the brake disk 500.

In this embodiment, the first oil inlet 411 and the second oil inlet 418 are not restricted to be respectively connected to the electronic driving assembly and the hydraulic assembly; in some other embodiments, the first oil inlet 411 may be connected to the hydraulic assembly, and the second oil inlet 418 may be connected to the electronic driving assembly. Or, the first oil inlet 411 and the second oil inlet 418 may be respectively connected to two electronic driving assemblies or two hydraulic assemblies.

Figure 15:
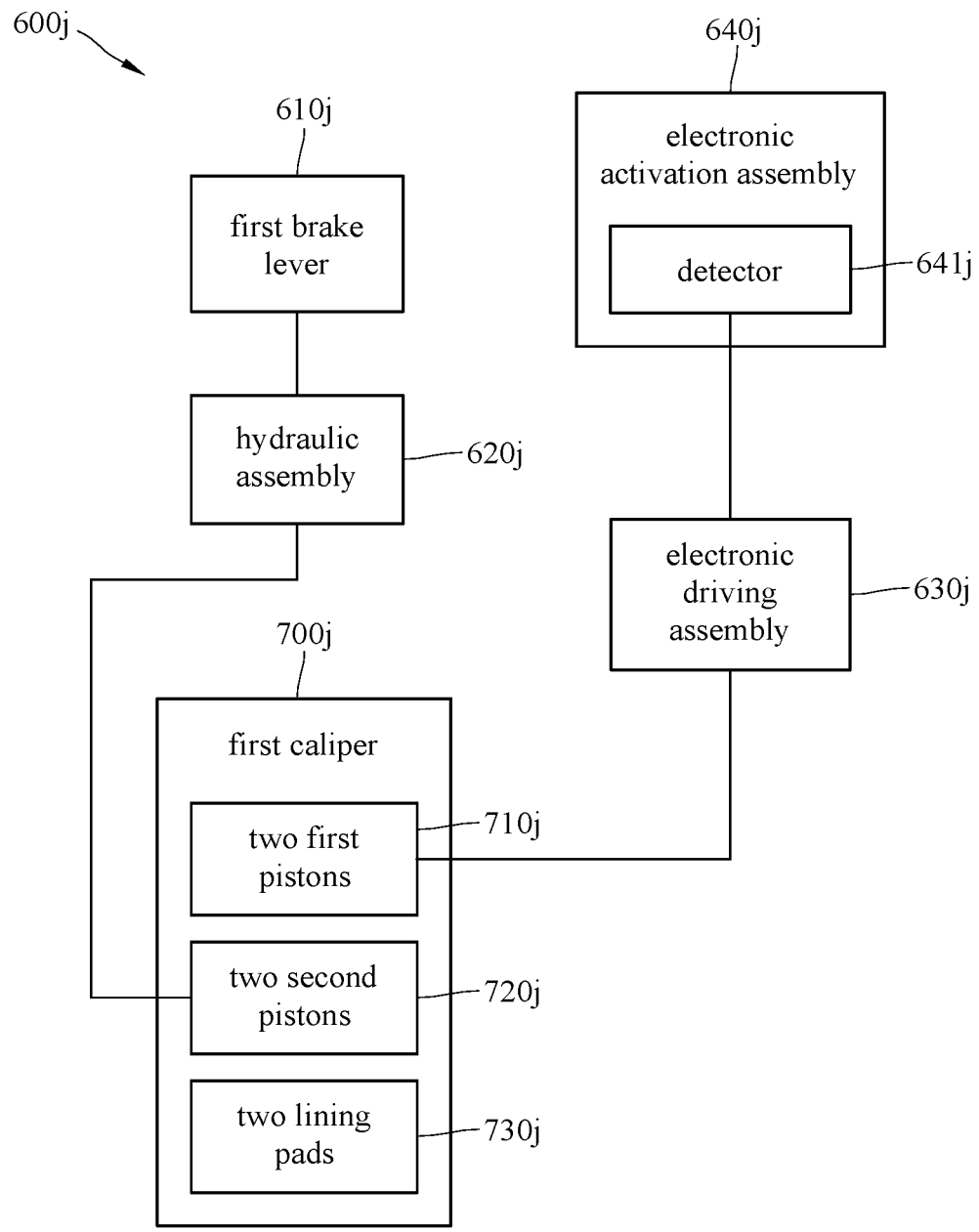
FIG. 15 is a block diagram of a bicycle caliper control system according to a twelfth embodiment of the disclosure.

Then, referring to FIG. 15, FIG. 15 is a block diagram of a bicycle caliper control system 600$j$ according to a twelfth embodiment of the disclosure.

In this embodiment, the bicycle caliper control system 600$j$ is configured to control a first caliper 700$j$ of a bicycle. The first caliper 700$j$ is, for example, a rear caliper of the bicycle, and the first caliper 700$j$ has, for example, two first pistons 710$j$, two second pistons 720$j$, and two lining pads 730$j$. The first pistons 710$j$ and the second pistons 720$j$ are configured to cause the lining pads 730$j$ to clamp a rear brake disk disposed on a rear wheel of the bicycle. The bicycle caliper control system 600$j$ includes a first brake lever 610$j$, a hydraulic assembly 620$j$, an electronic driving assembly 630$j$, and an electronic activation assembly 640$j$.

The first brake lever 610$j$ is, for example, a left brake lever of the bicycle. The hydraulic assembly 620$j$, for example, includes an oil tube having two opposite ends respectively connected to the first brake lever 610$j$ and the first caliper 700$j$. When the first brake lever 610$j$ is squeezed, the first brake lever 610$j$ produces oil pressure, and the hydraulic assembly 620$j$ transmits the oil pressure to the first caliper 700$j$ to push the second pistons 720$j$ of the first caliper 700$j$ so as to cause the lining pads 730$j$ to clamp the rear brake disk.

The electronic driving assembly 630$j$ is, for example, the electronic driving assembly shown in FIG. 11 or 12. The electronic driving assembly 630$j$ is connected to the first caliper 700$j$ via, for example, an oil tube. In this or another embodiment, the electronic activation assembly 640$j$ may be disposed on the first brake lever 610$j$, the electronic driving assembly 630$j$ or another component of the bicycle. The electronic activation assembly 640$j$ is electrically connected to the electronic driving assembly 630$j$, and the electronic activation assembly 640$j$ can activate the electronic driving assembly 630$j$ to push the first pistons 710$j$ of the first caliper 700$j$ so as to cause the lining pads 730$j$ to clamp the rear brake disk based on a brake rule. For example, the electronic activation assembly 640$j$ may include a detector 641$j$ capable of detecting the speed of the bicycle or a distance to the front vehicle. The brake rule includes: when the speed of the bicycle detected by the detector 641$j$ is higher than a predetermined speed or the distance to the front vehicle detected by the detector 641$j$ is less than a predetermined distance, the electronic driving assembly 630$j$ will be activated to cause the first pistons 710$j$ of the first caliper 700$j$ to move the lining pads 730$j$ so as to clamp the rear brake disk. As such, the bicycle can be braked manually by operating the first brake lever 610$j$, and also can be braked automatically by the electronic activation assembly 640$j$ when the conditions meet the brake rule.

In this embodiment, the quantity of the lining pads of the first caliper 700$j$ is two, but the present disclosure is not limited thereto; in some other embodiments, the first caliper may have four lining pads. In such configuration, two of the lining pads may be pushed by the first pistons, and the other may be pushed by the second pistons.

Figure 16:
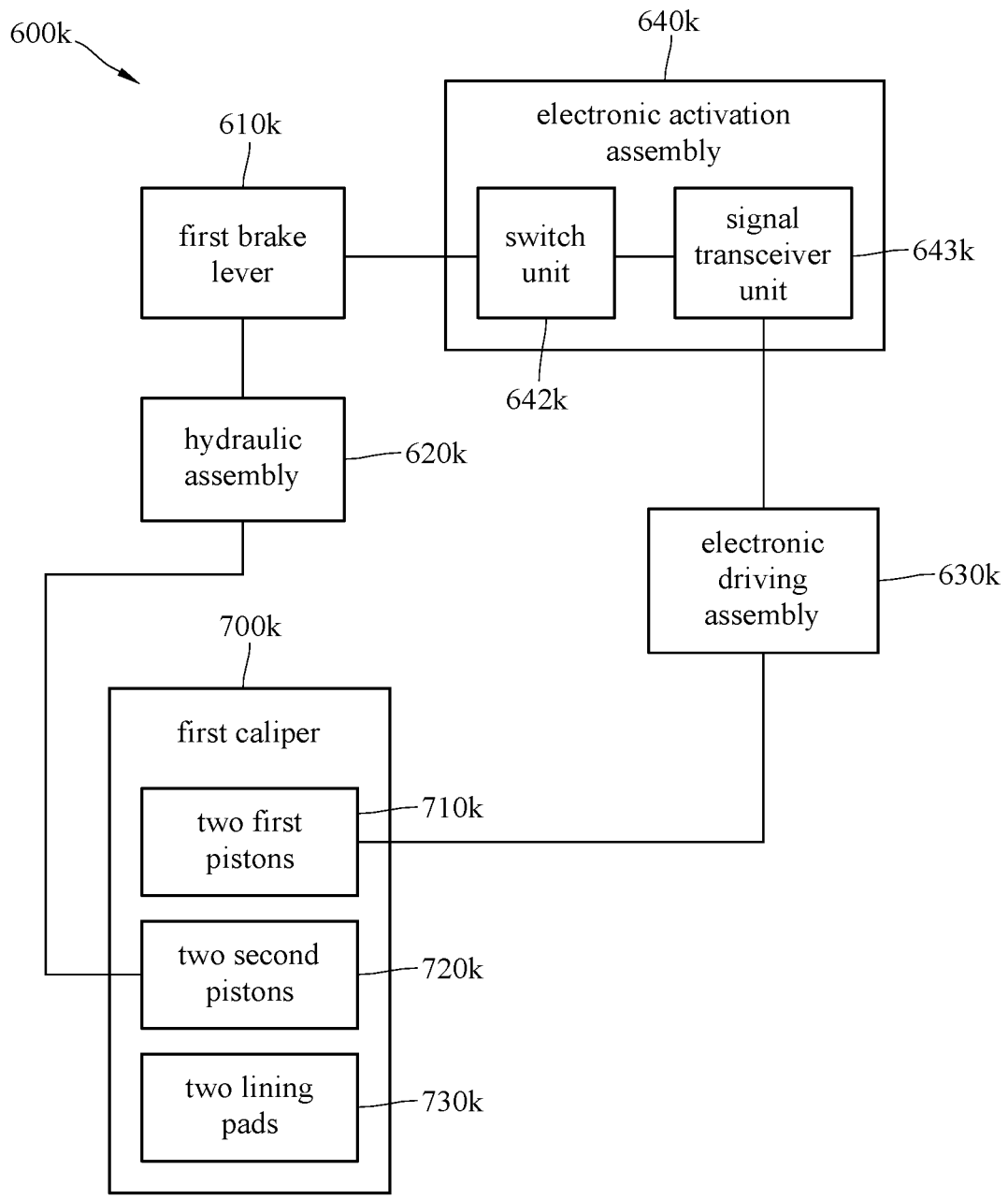
FIG. 16 is a block diagram of a bicycle caliper control system according to a thirteenth embodiment of the disclosure.

Then, referring to FIG. 16, FIG. 16 is a block diagram of a bicycle caliper control system 600$k$ according to a thirteenth embodiment of the disclosure.

In this embodiment, the bicycle caliper control system 600$k$ is configured to control a first caliper 700$k$ of a bicycle. The first caliper 700$k$ is, for example, a rear caliper of the bicycle. The first caliper 700$k$, for example, has two first pistons 710$k$, two second pistons 720$k$, and two lining pads 730$k$. The first pistons 710$k$ and the second pistons 720$k$ are configured to cause the lining pads 730$k$ to clamp a rear brake disk disposed on a rear wheel of the bicycle. The bicycle caliper control system 600$k$ includes a first brake lever 610$k$, a hydraulic assembly 620$k$, an electronic driving assembly 630$k$, and an electronic activation assembly 640$k$.

The connections among the first brake lever 610$k$, the hydraulic assembly 620$k$, and the first caliper 700$k$ and the way that the first brake lever 610$k$ drives the first caliper 700$k$ via the hydraulic assembly 620$k$ are similar to that of the previous embodiment shown in FIG. 15, and thus the same or similar descriptions are not repeated hereinafter.

The electronic driving assembly 630$k$ is, for example, the electronic driving assembly shown in FIG. 11 or 12. The electronic driving assembly 630$k$ is connected to the first caliper 700$k$ via, for example, an oil tube. In this or another embodiment, the electronic activation assembly 640$k$ may be disposed on the first brake lever 610$k$ or the electronic driving assembly 630$k$. The electronic activation assembly 640$k$ includes a switch unit 642$k$ and a signal transceiver unit 643$k$ electrically connected to each other. The switch unit 642$k$ is configured to be activated by the first brake lever 610$k$. In this or another embodiment, the connection between the switch unit 642$k$ and the first brake lever 610$k$ may be implemented by an oil tube or a cable, such that the switch unit 642$k$ can be activated by an oil pressure or a mechanical manner (e.g., pulling the cable). The signal transceiver unit 643$k$ is electrically connected to the switch unit 642$k$ and the electronic driving assembly 630$k$. When the first brake lever 610$k$ is squeezed, the switch unit 642$k$ is activated and request the signal transceiver unit 643$k$ to transmit the activation signal of the switch unit 642$k$ to the electronic driving assembly 630$k$. Then, the electronic driving assembly 630$k$ causes the first pistons 710$k$ of the first caliper 700$k$ to push the lining pads 730$k$ to clamp the rear brake disk.

Therefore, by operating the first brake lever 610$k$, the first brake lever 610$k$ can move the second pistons 720$k$ via the hydraulic assembly 620$k$, and move the first pistons 710$k$ via the electronic activation assembly 640$k$ and the electronic driving assembly 630$k$, such that the first pistons 710$k$ and the second pistons 720$k$ together push the lining pads 730$k$ to clamp the rear brake disk, thereby providing a superior braking strength of the first caliper 700$k$.

Figure 17:
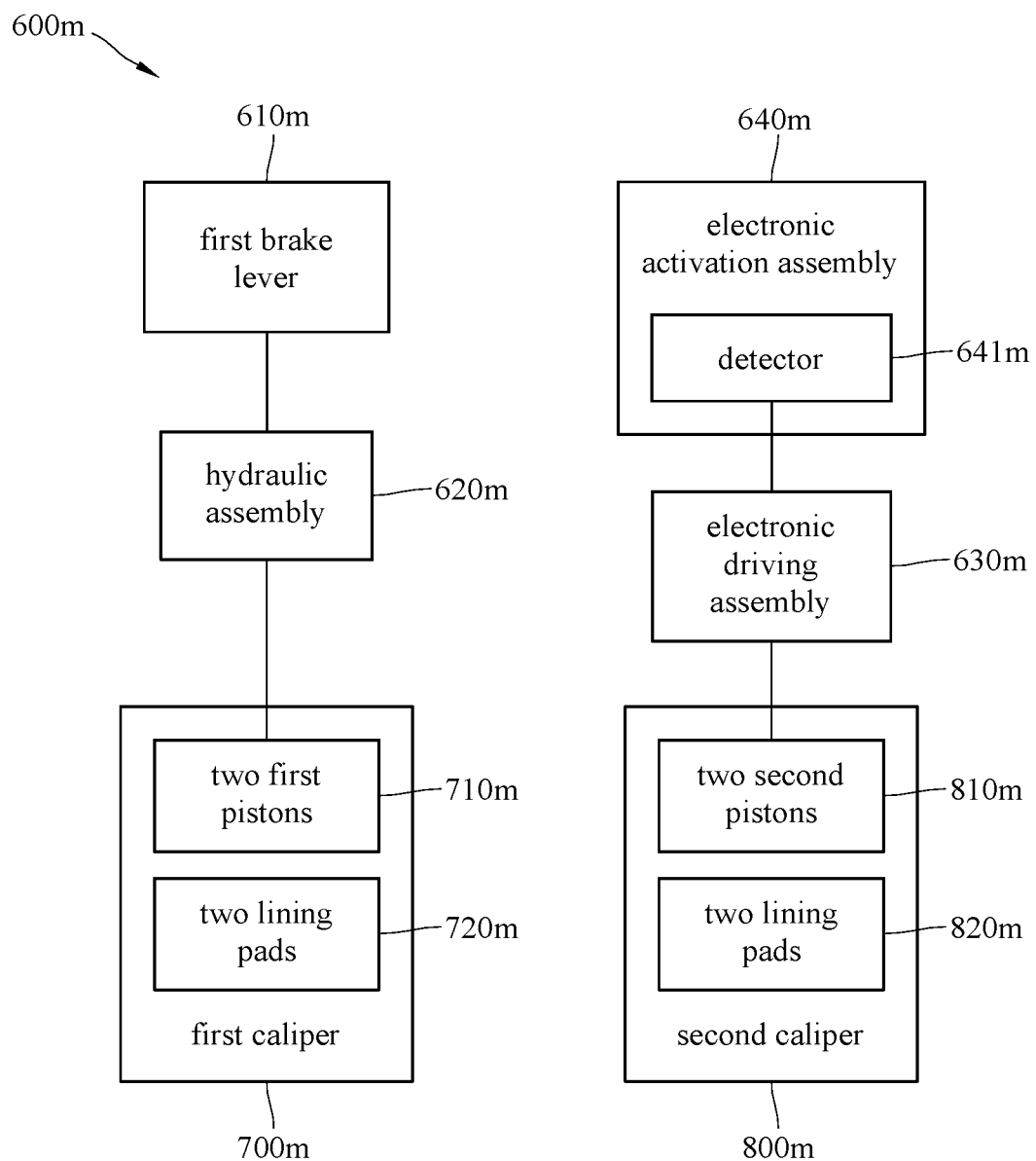
FIG. 17 is a block diagram of a bicycle caliper control system according to a fourteenth embodiment of the disclosure.

Then, referring to FIG. 17, FIG. 17 is a block diagram of a bicycle caliper control system 600$m$ according to a fourteenth embodiment of the disclosure.

In this embodiment, the bicycle caliper control system 600$m$ is configured to control a first caliper 700$m$ and a second caliper 800m of a bicycle. The first caliper 700m is, for example, a rear caliper of the bicycle, and the first caliper 700m, for example, has two first pistons 710m and two lining pads 720m. The first pistons 710m are configured to cause the lining pads 720m to clamp a rear brake disk disposed on a rear wheel of the bicycle. The second caliper 800m is, for example, a front caliper of the bicycle, and the second caliper 800m, for example, has two second pistons 810m and two lining pads 820m. The second pistons 810m are configured to cause the lining pads 820m to clamp a front brake disk disposed on a front wheel of the bicycle. The bicycle caliper control system 600m includes a first brake lever 610m, a hydraulic assembly 620m, an electronic driving assembly 630m, and an electronic activation assembly 640m.

The connections among the first brake lever 610m, the hydraulic assembly 620m, and the first caliper 700m and the way that the first brake lever 610m drive the first caliper 700m via the hydraulic assembly 620m are similar to that of the previous embodiment shown in FIG. 15, and thus the same or similar descriptions are not repeated hereinafter.

The electronic driving assembly 630m is, for example, the electronic driving assembly shown in FIG. 11 or 12. The electronic driving assembly 630m is connected to the second caliper 800m via an oil tube. In this or another embodiment, the electronic activation assembly 640m may be disposed on the first brake lever 610m, the electronic driving assembly 630m or another component of the bicycle. The electronic activation assembly 640m is electrically connected to the electronic driving assembly 630m, and the electronic activation assembly 640m can activate the electronic driving assembly 630m to move the second piston 810m of the second caliper 800m so as to push the lining pads 820 to clamp the front brake disk based on a brake rule. For example, the electronic activation assembly 640m includes a detector 641m capable of detecting the speed of the bicycle and a distance to the front vehicle. The brake rule includes: when the speed of the bicycle detected by the detector 641m is higher than a predetermined speed or the distance to the front vehicle detected by the detector 641m is less than a predetermined distance, the electronic driving assembly 630m will be activated to cause the second pistons 810m of the second caliper 800m to push the lining pads 820m to clamp the front brake disk.

Figure 18:
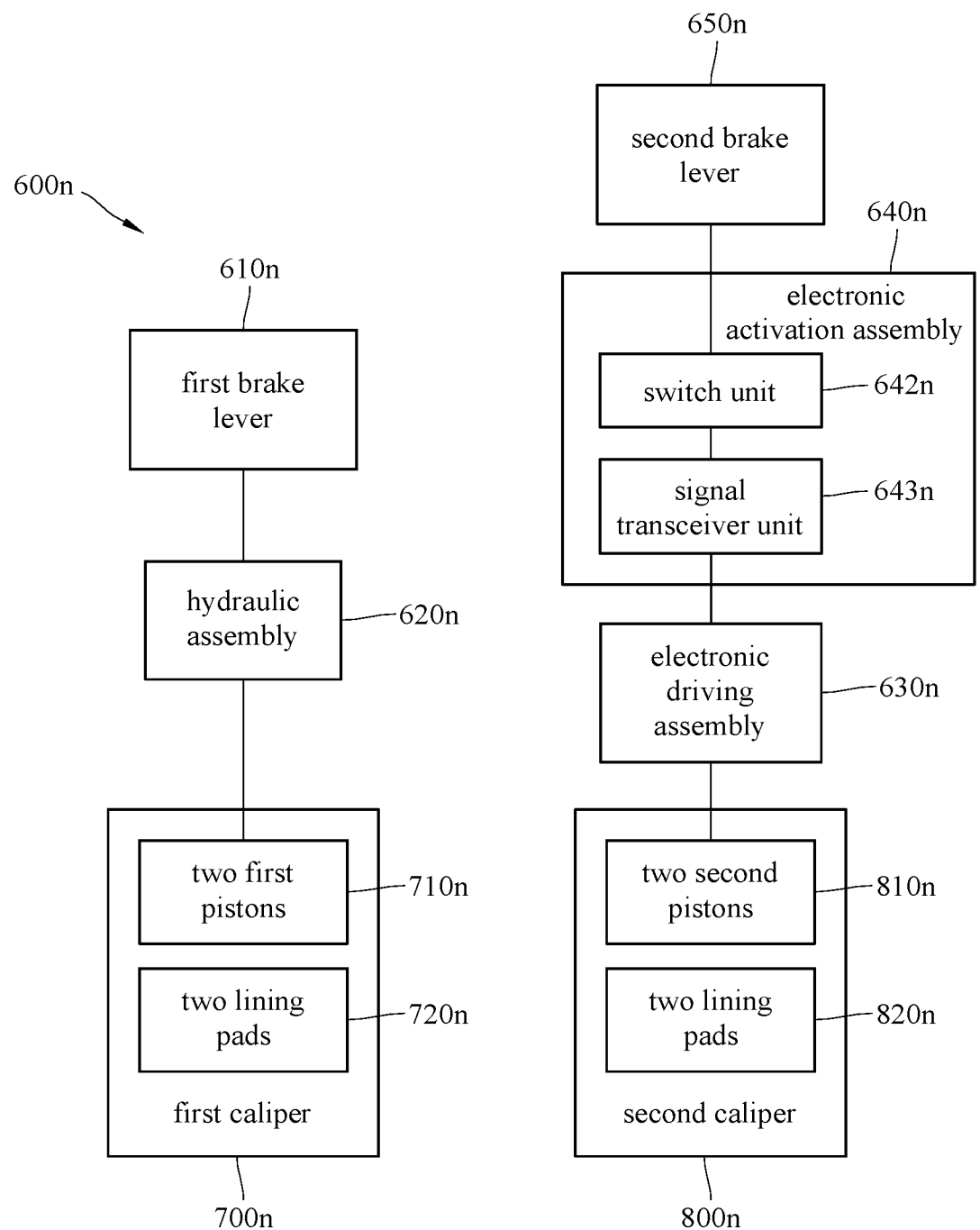
FIG. 18 is a block diagram of a bicycle caliper control system according to a fifteenth embodiment of the disclosure.

Then, referring to FIG. 18, FIG. 18 is a block diagram of a bicycle caliper control system 600n according to a fifteenth embodiment of the disclosure.

In this embodiment, the bicycle caliper control system 600n is configured to control a first caliper 700n and a second caliper 800n of a bicycle. The first caliper 700n is, for example, a rear caliper of the bicycle, and the first caliper 700n, for example, has two first pistons 710n and two lining pads 720n. The first pistons 710n are configured to cause the lining pads 720n to clamp a rear brake disk disposed on a rear wheel of the bicycle. The second caliper 800n is, for example, a front caliper of the bicycle, and the second caliper 800n, for example, has two second pistons 810n and two lining pads 820n. The second pistons 810n are configured to cause the lining pads 820n to clamp a front brake disk disposed on a front wheel of the bicycle. The bicycle caliper control system 600n includes a first brake lever 610n, a hydraulic assembly 620n, a second brake lever 650n, an electronic driving assembly 630n, and an electronic activation assembly 640n.

The connections among the first brake lever 610n, the hydraulic assembly 620n, and the first caliper 700n and the way that the first brake lever 610n drives the first caliper 700n via the hydraulic assembly 620n are similar to the previous embodiment shown in FIG. 15, and thus the same or similar descriptions are not repeatedly hereinafter.

The electronic driving assembly 630n is, for example, the electronic driving assembly shown in FIG. 11 or 12. The electronic driving assembly 630n is connected to the second caliper 800n via, for example, an oil tube. In this or another embodiment, the electronic activation assembly 640n may be disposed on the second brake lever 650n or the electronic driving assembly 630n. The electronic activation assembly 640n includes a switch unit 642n and a signal transceiver unit 643n electrically connected to each other. The switch unit 642n is configured to be activated by the second brake lever 650n. In this or another embodiment, the switch unit 642n is connected to the second brake lever 650n via an oil tube or a cable, such that the switch unit 642n can be activated by an oil pressure or a mechanical manner (e.g., pulling the cable). The signal transceiver unit 643n is electrically connected to the switch unit 642n and the electronic driving assembly 630n. When the second brake lever 650n is squeezed, the switch unit 642n is activated and request the signal transceiver unit 643n to transmit the activation signal of the switch unit 642n to the electronic driving assembly 630n. Then, the electronic driving assembly 630n moves the second pistons 810n of the second caliper 800n to push the lining pads 820n to clamp the front brake disk.

In the aforementioned embodiments, the hydraulic assembly connecting the brake lever with the caliper is not restricted to only include the oil tube; in some other embodiments, the hydraulic assembly may further include a pressure tank and a piston located in the pressure tank. In such a configuration, the brake lever is connected to the piston via a cable, and the pressure tank is connected to the caliper via the oil tube. When the brake lever is squeezed, the brake lever moves the piston via the cable so as to produce oil pressure in the pressure tank, and the oil pressure can be transmitted to the caliper via the oil tube.

According to the bicycle calipers, the bicycle caliper control systems, and the bicycle caliper control methods as discussed in the above embodiments, when the first brake lever is squeezed, the first brake lever can activate both the front caliper and the rear caliper to brake the front wheel and the rear wheel of the bicycle, such that the speed difference between the front wheel and the rear wheel can be reduced or substantially eliminated, thereby securing the safety during cycling.

In addition, during one squeeze of the first brake lever, a time-lag between activating the first pistons of the rear caliper and activating the pistons of the front caliper can be produced for moving the first pistons of the rear caliper before the pistons of the front caliper moves, which helps to prevent losing control of the bicycle when sudden braking of the front caliper occurs, thereby further securing the safety during cycling.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A bicycle caliper control method, configured to control a rear caliper and a front caliper of a bicycle, comprising:
   when a first brake lever of the bicycle is squeezed, the first brake lever activates the rear caliper and the front caliper, wherein the first brake lever is directly, wirelessly and electrically connected to a rear electronic driving assembly, and the rear electronic driving assembly is only and directly driven by the first brake lever to activate the rear caliper; and when a second brake lever of the bicycle is squeezed, the second brake lever activates the rear caliper;

wherein in the step of the first brake lever activating the rear caliper and the front caliper, the first brake lever firstly activates the rear caliper and then activates the front caliper.

2. The bicycle caliper control method according to claim 1, wherein in the step of the second brake lever activating the rear caliper, the second brake lever activates the rear caliper via a rear hydraulic assembly.

3. The bicycle caliper control method according to claim 2, wherein the rear caliper has two first pistons and two second pistons, the first brake lever pushes the two first pistons via the rear electronic driving assembly so as to activate the rear caliper, the second brake lever pushes the two second pistons via the rear hydraulic assembly so as to activate the rear caliper.

4. The bicycle caliper control method according to claim 3, wherein the front caliper has two pistons; in the step of the first brake lever activating the front caliper, the first brake lever pushes the two pistons via a front hydraulic assembly so as to activate the front caliper.

5. The bicycle caliper control method according to claim 3, wherein the front caliper has two pistons; in the step of the first brake lever activating the front caliper, the first brake lever pushes the two pistons via a front electronic driving assembly so as to activate the front caliper.

\* \* \* \* \*